(12) United States Patent
Cole et al.

(10) Patent No.: US 12,269,717 B2
(45) Date of Patent: Apr. 8, 2025

(54) PULLEY BLOCK

(71) Applicants: Christopher Cole, Tularosa, NM (US);
James K. Geroux, Fort Edward, NY (US)

(72) Inventors: Christopher Cole, Tularosa, NM (US);
James K. Geroux, Fort Edward, NY (US)

(*) Notice: Subject to any disclaimer, the term of this patent is extended or adjusted under 35 U.S.C. 154(b) by 227 days.

(21) Appl. No.: 17/838,346

(22) Filed: Jun. 13, 2022

(65) Prior Publication Data
US 2022/0306435 A1 Sep. 29, 2022

Related U.S. Application Data

(63) Continuation of application No. PCT/US2020/064426, filed on Dec. 11, 2020.

(60) Provisional application No. 62/947,301, filed on Dec. 12, 2019.

(51) Int. Cl.
*B66D 3/04* (2006.01)

(52) U.S. Cl.
CPC ........ *B66D 3/046* (2013.01); *B66D 2700/026* (2013.01)

(58) Field of Classification Search
CPC .......... B66D 3/046; B66D 3/04; B66D 3/043; B66D 3/06; B66D 3/08; B66D 3/10; B66D 2700/026; F16H 55/36; F16H 55/52; F16H 55/54; F16H 55/56
See application file for complete search history.

(56) References Cited

U.S. PATENT DOCUMENTS

| | | | | |
|---|---|---|---|---|
| 1,406,560 A | * | 2/1922 | Houghton | B66D 3/046 254/412 |
| 1,800,700 A | * | 4/1931 | Patton | B66D 3/04 254/412 |
| 2,555,059 A | * | 5/1951 | Schrader | B66D 3/046 254/412 |
| 3,337,188 A | * | 8/1967 | Manson | B66D 3/04 254/412 |
| 4,390,163 A | * | 6/1983 | Merry | B66D 3/04 384/627 |
| 5,056,760 A | * | 10/1991 | Jorgensen | B66D 3/046 254/402 |
| 7,533,870 B2 | | 5/2009 | Camrass et al. | |

(Continued)

FOREIGN PATENT DOCUMENTS

| | | | | |
|---|---|---|---|---|
| FR | 2945603 A1 | 11/2012 | | |
| KR | 200349007 Y1 | * 4/2004 | | B66D 3/046 |
| WO | 2014065762 A1 | 5/2014 | | |

*Primary Examiner* — Sang K Kim
*Assistant Examiner* — Nathaniel L Adams
(74) *Attorney, Agent, or Firm* — Rankin, Hill & Clark LLP

(57) ABSTRACT

A pulley block that includes a first side plate, a second side plate and an axle received in the first side plate and the second side plate. The axle is fixed with the first side plate and in a floating relationship with the second side plate such that the second side plate is retained on the axle and capable of rotating around the axle. The axle defines a central opening configured for receiving a soft shackle and a pulley supported on the axle between the first side plate and the second side plate in a longitudinal direction of the axle. The pulley is configured for receiving a winch line around an outer perimeter thereof. Also a method of installing a winch line on such a pulley block.

19 Claims, 20 Drawing Sheets

(56) References Cited

U.S. PATENT DOCUMENTS

| | | | |
|---|---|---|---|
| 9,908,749 B2* | 3/2018 | Lob .......................... | B66D 3/04 |
| 2009/0114893 A1* | 5/2009 | Lange ..................... | B66D 3/04 |
| | | | 254/390 |
| 2009/0200530 A1* | 8/2009 | Curchod ................. | B66D 3/04 |
| | | | 254/390 |

* cited by examiner

PULLEY BLOCK

CROSS-REFERENCE TO RELATED APPLICATIONS

This application is a continuation of International Application No. PCT/US20/64426, filed Dec. 11, 2020, and claims priority to U.S. Provisional Application. Ser. No. 62/947,301, filed Dec. 12, 2019, both of which are hereby incorporated by reference in their entirety.

BACKGROUND OF INVENTION

Field of Invention

The present invention relates to a pulley block. More particularly, the present invention relates to a pulley block and a method of installing a winch line on such a pulley block.

Brief Description of Related Art

Pulley blocks are used in a variety of applications including vehicle recovery operations (e.g., using a winch line). A pulley block can be used in such applications to gain mechanical advantage using a double line pull ("DLP"), where the winch line passes over the pulley block. Multiple pulley blocks can be used to multiply the mechanical advantage (e.g., a Spanish burton "SB" arrangement). For example, a DLP using one pulley block provides a 2:1 mechanical advantage, whereas a SB using 2 pulley blocks provides a 4:1 mechanical advantage.

Two pulley block types commonly known in the art include the standard pulley block depicted in FIG. 1 and the standard snatch block depicted in FIG. 2. As depicted in FIG. 1, a standard pulley block 100, which is typically used in vehicle recovery operations, for example, is usually connected to an anchor (not shown) with a screw pin bow shackle 102. A winch line 104 is captured between "cheeks" 110 of the standard pulley block 100, and rides on a pulley 112. In order to insert the winch line 104 into the standard pulley block 100, the screw pin bow shackle 102 must be removed to open the cheeks 110 by rotation relative to the pulley 112. This, by necessity, means that the standard pulley block 100 must be disconnected from the anchor in order to insert or remove the winch line 104. Once the winch line 104 is secured between the cheeks 110 and the screw pin bow shackle 102 is reinserted through a hole 114 that aligns the cheeks 110, the winch line 104 cannot fall out of a groove in the pulley 112, even if the load on the standard pulley block 100 is temporarily released. The cheeks 110 of the standard pulley block 100 are secured with a pin 120, which must be removed, by rotation, to open the cheeks 110 to install or remove the winch line 104.

As depicted in FIG. 2, a standard snatch block 200, which is not typically used in vehicle recover operations, differs from a standard pulley block 100 in that the cheeks 110 of the standard pulley block 100 are secured with the pin 120, which must be removed to open the cheeks 110 to install or remove the winch line 104. With the standard snatch block 200, however, only one cheek 202 rotates to allow the winch line 104 to be inserted or removed, while another cheek 202 is connected to an anchor (not shown). Thus the standard snatch block 200 may remain anchored during the process of installing or removing the winch line 104. Once a pin 204 holding the cheeks 202 in place is reinserted, a winch line 210 disposed between the cheeks 202 cannot fall out of the standard snatch block 200 inasmuch as it is captured between the cheeks 202.

Standard pulley blocks and standard snatch blocks such as those respectively depicted in FIGS. 1 and 2 tend to be quite heavy, and for at least this reason there has been an effort to find suitable alternatives. Another vehicle recovery device sometimes referred to as a "recovery ring" originated in the sport of yachting. As depicted in FIG. 3, a recovery ring 300 is a pulley 302 anchored by a soft shackle 304 that runs through a central opening 310 of the pulley 302. An example of a "recovery ring" is shown in FIG. 3. A winch line 312 is wrapped in a groove 314 of the pulley 302, and then the soft shackle 304 is passed through the central opening 310 in the pulley 302 and anchored.

While the recovery ring 300 can be produced with significantly reduced weight as compared to a standard pulley block, this overall design introduces several performance costs. First, there is considerable friction on the soft shackle 304 where it passes through the central opening 310 of the pulley 302 as the pulley 302 rotates on the soft shackle 304 during use. Winch line 312 movement causes the pulley 302 to rotate on the soft shackle 304. As the soft material of the recovery ring 300 wears, and suffers nicks and scars due to contact with other equipment over time, the friction during use increases and wear and damage to the soft shackle 304 becomes a concern. Friction and grinding is also exacerbated when the recovery ring 300 is used in sandy or muddy conditions, where sand or grit becomes trapped between the soft shackle 304 and the pulley 302, and functions a grinding media. Friction is also significant on the winch line 312 during use, and is principally caused by the pulley 302 failing to rotate on the soft shackle 304 due to the described friction between the pulley 302 and the soft shackle 304. This accumulated friction can significantly reduce the mechanical advantage and load pulling capability, which is contrary to the intended function of the recovery ring 300.

The second major problem with use of the recovery ring 300 is that the winch line 312 is not retained in the groove 314 of the recovery ring because there are no cheeks present to prevent the winch line 312 from falling, jumping, or otherwise moving out of the groove 314. In the event of a temporary reduction in load on the system, such as when a stuck vehicle being recovered with the recovery ring 300 temporarily gains traction and moves under its own power, the winch line 312 can "fall" or "jump" out of the groove 314 of the recovery ring 300. When the load returns, such as when the stuck vehicle loses traction and begins sliding back, the winch line 312 can be born entirely by the soft shackle 304, with the recovery ring 300 simply positioned uselessly to the side. This requires prompt action to reduce load on the system and reinstall the winch line 312 in the groove 314 of the pulley 302 or risk serious damage to at least one of the winch line 312 and the soft shackle 304.

BRIEF SUMMARY OF THE INVENTION

According to one aspect, a pulley block includes a first side plate, a second side plate, an axle received in the first side plate and the second side plate, the axle being fixed with the first side plate and in a floating relationship with the second side plate such that the second side plate is retained on the axle and capable of rotating around the axle, where the axle defines a central opening configured for receiving a soft shackle, and a pulley supported on the axle between the first side plate and the second side plate in a longitudinal direction of the axle, the pulley being configured for receiving a winch line around an outer perimeter thereof.

According to another aspect, A pulley block has a first side plate fixed relative to an axle, a first extension supported on the first side plate, a second side plate supported on the axle in a floating relationship with the axle, a second extension supported on the second side plate, and a pulley supported on the axle, where the pulley extends between the first side plate and the second side plate along a longitudinal direction of the axle, and where the first shackle eye and the second shackle eye respectively extend inward from the first side plate and the second side plate over the pulley in the longitudinal direction of the axle.

According to another aspect, a method of installing a winch line on a pulley block includes fixing a first side plate with an axle, supporting a pulley on the axle, supporting a first extension on the first side plate, where the first extension extends from the first side plate, over the pulley in a longitudinal direction of the axle, receiving the axle in a second side plate such that the second side plate is retained on the axle in a floating relationship with the axle, and supporting a second extension on the second side plate, where the second extension extends from the second side plate, over the pulley in the longitudinal direction of the axle. The method also includes rotating the second side plate around the axle relative to the first side plate such that the first extension is spaced from the second extension, forming a gap between the first extension and the second extension through which a winch line can be inserted. The method also includes inserting a winch line through the gap between the first extension and the second extension, and arranging the winch line on the pulley.

According to another aspect, a method of installing a winch line on a pulley block includes fixing a first side plate with an axle, supporting a pulley on the axle, receiving the axle in a second side plate such that the second side plate is retained on the axle in a floating relationship with the axle, passing a soft shackle through a first shackle eye supported on a first side plate, passing the soft shackle through a second shackle eye supported on a second side plate, and passing the soft shackle through a central opening in the axle. The method also includes rotating the second side plate around the axle relative to the first side plate such that the second shackle eye is rotated away from the first shackle eye, spacing the first shackle eye from the second shackle eye and forming an opening in the soft shackle between the central opening in the axle, the first shackle eye, and the second shackle eye through which the winch line can pass. The method also includes inserting the winch line through the opening in the soft shackle, and arranging the winch line on the pulley.

According to another aspect, a pulley block includes a first side plate, a second side plate, and an axle received in the first side plate and the second side plate, the axle being in a floating relationship with the first side plate and the second side plate such that the first side plate and the second side plate are retained in a floating relationship with the axle where the first side plate is configured to rotate in a circumferential direction of the axle relative to the second side plate, and the second side plate is configured to rotate relative to the first side plate in the circumferential direction of the axle and capable of rotating around the axle. The pulley block also includes a central opening defined in the axle and configured for receiving a soft shackle, and a pulley supported on the axle between the first side plate and the second side plate in a longitudinal direction of the axle, the pulley being configured for receiving a winch line around an outer perimeter thereof.

According to another aspect, a pulley block has a first side plate supported on the axle in a floating relationship with the axle, a first extension supported on the first side plate, a second side plate supported on the axle in a floating relationship with the axle, a second extension supported on the second side plate, and a pulley supported on the axle, where the pulley extends between the first side plate and the second side plate along a longitudinal direction of the axle, and where the first extension and the second extension respectively extend inward from the first side plate and the second side plate over the pulley in the longitudinal direction of the axle.

The foregoing and other features of the invention are hereinafter more fully described below, the following description setting forth in detail certain illustrative embodiments of the invention, these being indicative, however, of but a few of the various ways in which the principles of the present invention may be employed.

DETAILED DESCRIPTION OF THE INVENTION

Figure 1:
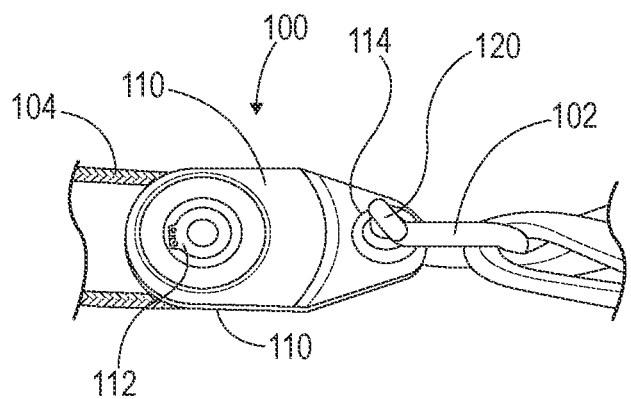
FIG. 1 is a perspective view of a standard pulley block.
Figure 2:
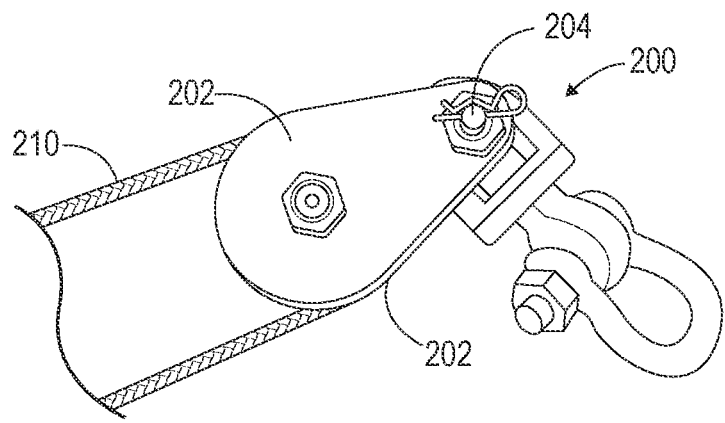
FIG. 2 is a perspective view of a standard snatch block.
Figure 3:
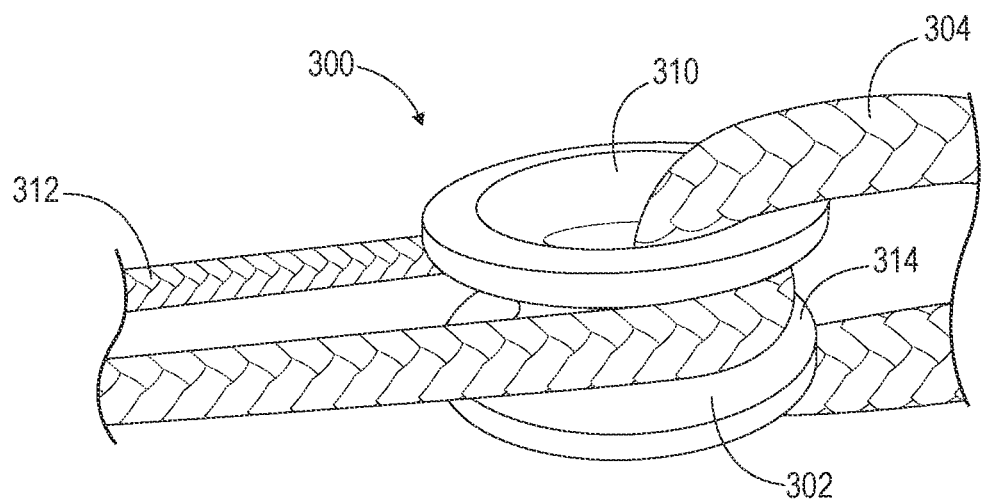
FIG. 3 is a perspective view of a recovery ring.
Figure 4:
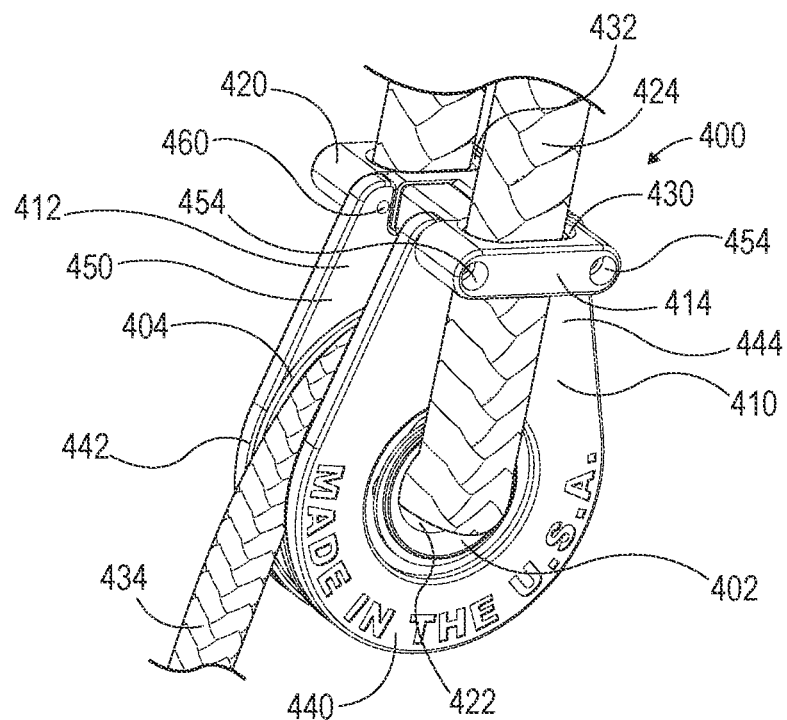
FIG. 4 is a perspective view of a pulley block.

It should, of course, be understood that the description and drawings herein are merely illustrative and that various modifications and changes can be made in the structures disclosed without departing from the present disclosure. Referring now to the drawings, wherein like numerals refer to like parts throughout the several views, FIG. 4 depicts a pulley block 400 including an axle 402 supporting a pulley 404 in the pulley block 400, a first side plate 410 that is fixed relative to the axle 402, a second side plate 412 that is floating relative to the axle 402, a first shackle eye 414 received in and supported on the first side plate 410, and a second shackle eye 420 received in and supported on the second side plate 412. The pulley 404 is supported on the axle 402 between the first side plate 410 and the second side plate 412 along the axle 402, where the first shackle eye 414 and the second shackle eye 420 respectively extend inward from the first side plate 410 and the second side plate 412 over the pulley 404 in a longitudinal direction of the axle 402.

The axle 402 defines a central opening 422 configured for receiving a soft shackle 424, the first shackle eye 414 defines a first eyelet 430 configured for receiving the soft shackle 424, and the second shackle eye 420 defines a second eyelet 432 configured for receiving the soft shackle 424. With the soft shackle 424 passing through the axle 402, the first shackle eye 414, and the second shackle eye 420, the soft shackle 424 is secured to the pulley block 400.

With the first side plate 410 in a fixed relationship with the axle 402 and the second side plate 412 in a floating relationship with the axle 402, the second side plate 412 is configured for rotating relative to the first side plate 410, and in this manner the first side plate 410 and the second side plate 412 are configured for being rotated relative to each other with the soft shackle 424 retained respectively in the first eyelet 430 and the second eyelet 432 to allow a winch line 434 to be inserted or removed from the pulley 404. With the soft shackle 424 under load with the winch line 434, the first shackle eye 414 and the second shackle eye 420 force the first side plate 410 to close with the second side plate 412 such that the first shackle eye 414 engages the second shackle eye 420, which retains the winch line 434 in the pulley block 400 and on the pulley 404.

The axle 402 is received in the first side plate 410 at a proximal end 440 of the first side plate 410, and the axle 402 is received in the second side plate 412 at a proximal end 442 of the second side plate 412. A distal end 444 of the first side plate 410 extends from the proximal end 440 in a radial direction of the pulley 404 to support the first shackle eye 414 on the pulley block 400 away from the pulley 404 in the radial direction of the pulley 404 to space the first shackle eye 414 from the pulley 404 a sufficient distance to accommodate the winch line 434 in the pulley block 400. A distal end 450 of the second side plate 412 extends from the proximal end 442 to support the second shackle eye 420 on the pulley block 400 away from the pulley 404 in the radial direction of the pulley 404 a sufficient distance to accommodate the winch line 434 in the pulley block 400.

Figure 5:
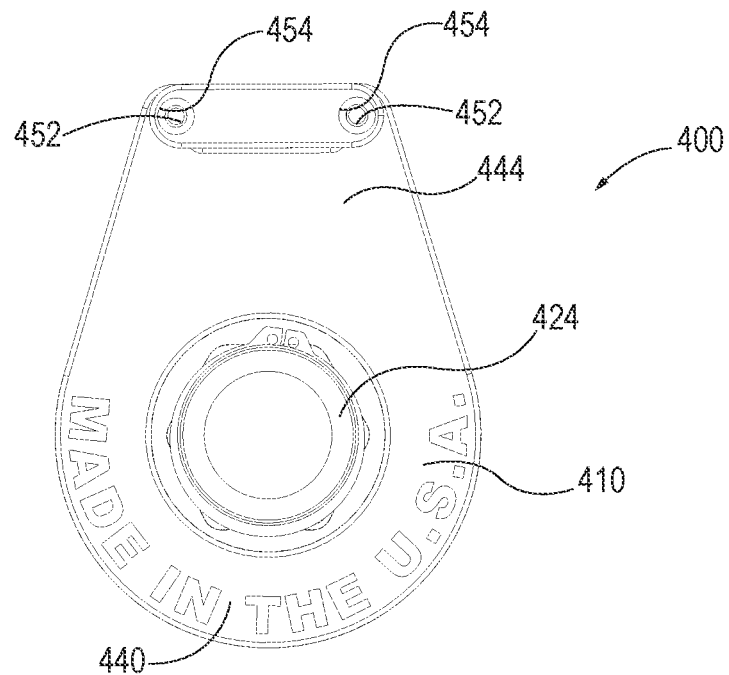
FIG. 5 is a front view of the pulley block of FIG. 4.

As shown in FIG. 5, the axle 402 is positioned concentrically within the proximal end 440 of the first side plate 410. The first side plate 410 defines apertures 452 which are threaded and positioned in the distal end 444, and the first shackle eye 414 defines apertures 454, where, when the first side plate 410 is assembled with the first shackle eye 414, the apertures 452 of the first side plate 410 align with the apertures 454 of the first shackle eye 414 and are configured for receiving fasteners (not shown) for fixing the first side plate 410 with the first shackle eye 414.

The second side plate 412 features a similar construction and functions in a similar manner as the first side plate 410. To this end, with reference to FIG. 4, the axle 402 is positioned concentrically within the proximal end 442 of the second side plate 412. Also, the second side plate 412 defines apertures 460 which are threaded and positioned in the distal end 450, and the second shackle eye 420 defines apertures 462 (FIG. 8), where, when the second side plate 412 is assembled with the second shackle eye 420, the apertures 460 of the second side plate 412 align with the apertures 462 of the second shackle eye 420 and are configured for receiving fasteners (not shown) for fixing the second side plate 412 with the second shackle eye 420.

Figure 6:
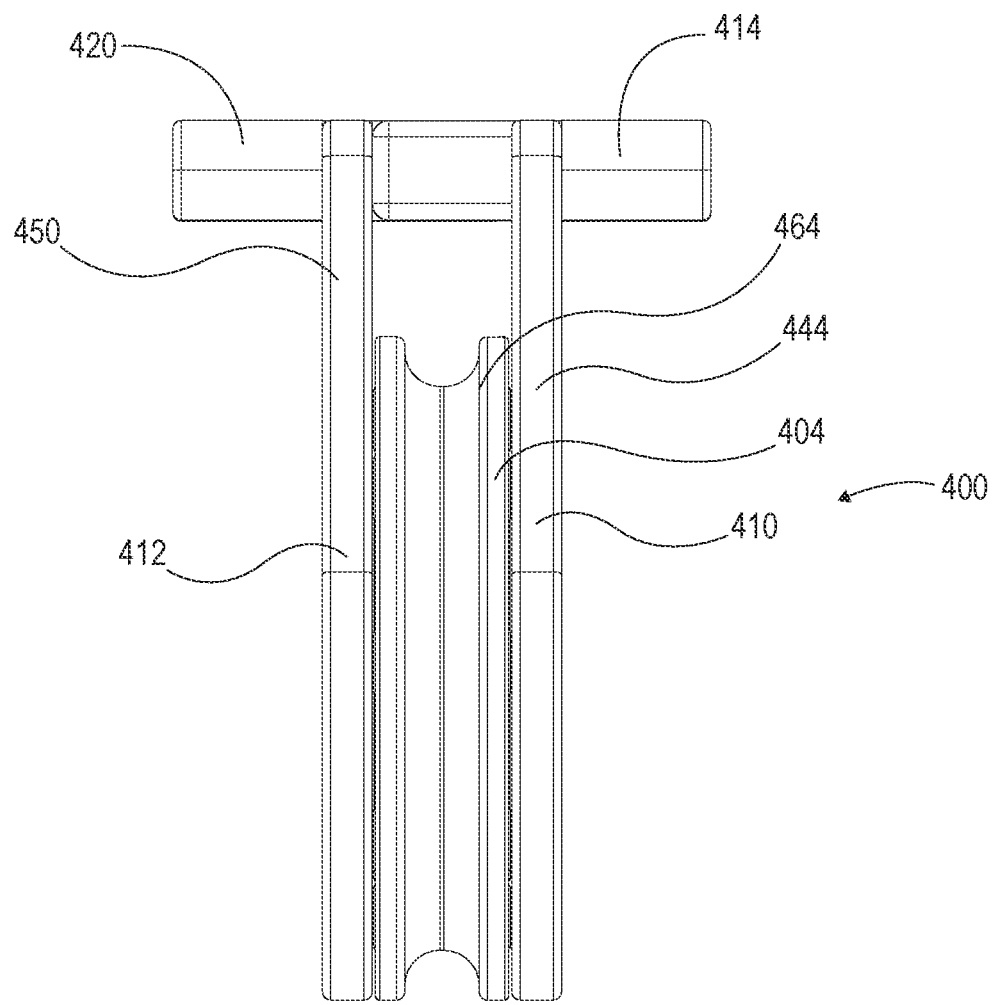
FIG. 6 is a side view of the pulley block of FIG. 4.

FIG. 6 depicts a side view of the pulley block 400. As shown in FIG. 6, the pulley 404 is interposed between and separates the first side plate 410 and the second side plate 412. The pulley 404 includes a groove 464 defined around an outer perimeter thereof, the groove being configured for receiving the winch line 434, where the distal end 444 of the first side plate 410 and the distal end 450 of the second side plate 412 respectively support the first shackle eye 414 and the second shackle eye 420 away from the groove 464 in the pulley 404 with sufficient clearance for accommodating the winch line 434 around the outer perimeter of the pulley 404 between the pulley 404, the first shackle eye 414, and the second shackle eye 420.

Figure 7:
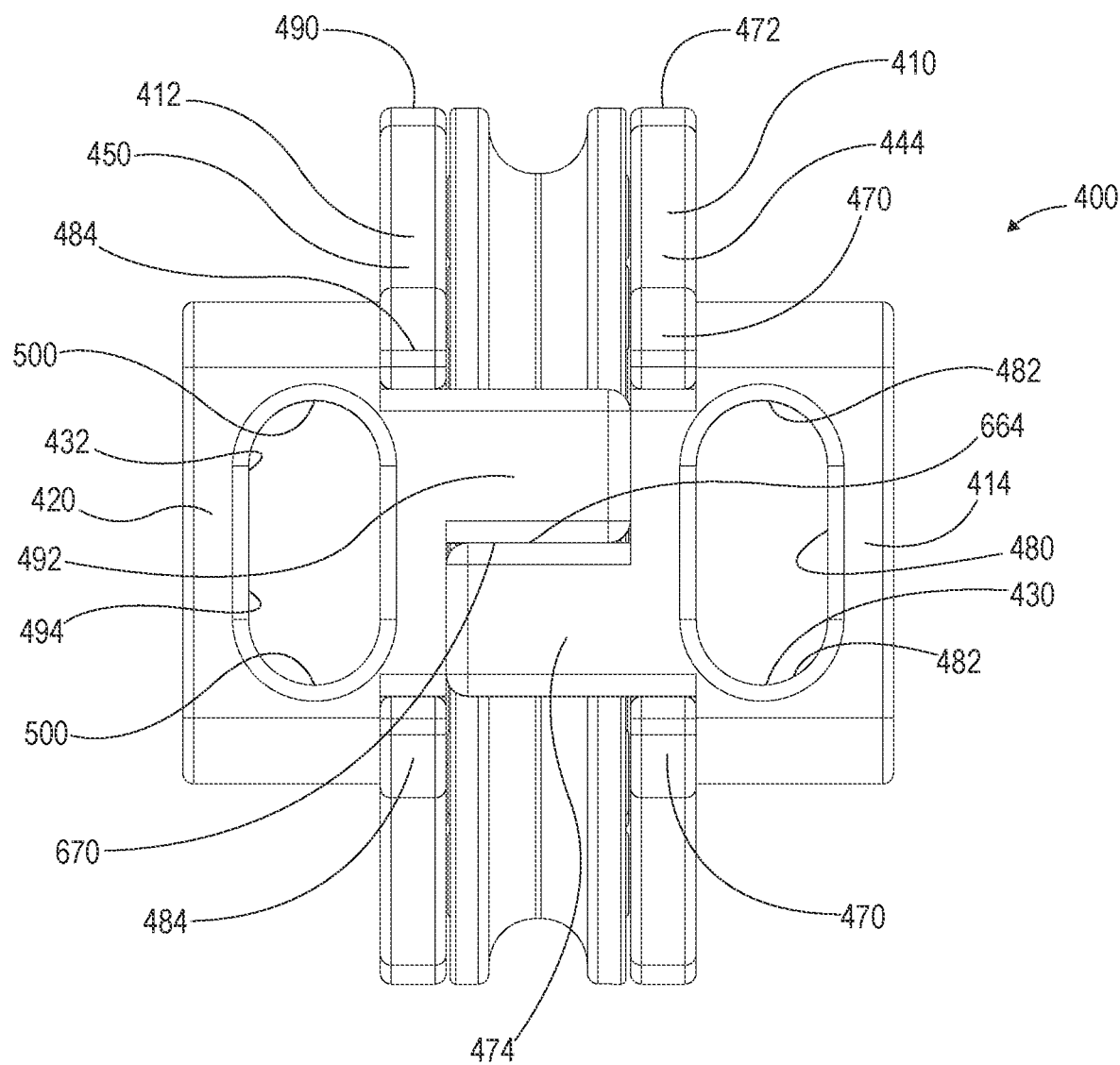
FIG. 7 is a top view of the pulley block of FIG. 4.

FIG. 7 depicts a top view of the pulley block 400. As shown in FIG. 7, the first shackle eye 414 is received in the first side plate 410 between a first set of fingers 470 protruded from an outer perimeter 472 of the first side plate 410 at the distal end 444 of the first side plate 410. The first shackle eye 414 includes a first extension 474 which, from a top view of the pulley block 400, passes over the pulley 404 toward the second side plate 412. The first extension 474 extends from the distal end 444 of the first side plate 410 and is integrally formed from the first shackle eye 414.

The first eyelet 430 is defined entirely in the first shackle eye 414 with a discorectangle shape characterized as a slot with an elongated middle section 480 and proximal ends 482 extended through the first shackle eye 414. The middle section 480 and both ends 482 of the first eyelet have rounded edges that form arcuate entries with the first shackle eye, the arcuate entries having a smooth finish.

The second side plate 412 and the second shackle eye 420 respectively feature a similar construction, and function in a similar manner as the first side plate 410 and the first shackle eye 414. To this end, the second shackle eye 420 is received in the second side plate 412 between a second set of fingers 484 protruded from an outer perimeter 490 of the second side plate 412 at the distal end 450 of the second side plate 412. The second shackle eye 420 includes a second extension 492 which, from a top view of the pulley block 400, passes over the pulley 404 toward the first side plate 410. The second extension 492 extends from the distal end 450 of the second side plate 412 and is integrally formed from the second shackle eye 420.

With the pulley block 400 in a closed position, where the second side plate 412 is rotated relative to the first side plate 410 such that the first shackle eye 414 is engaged with the second shackle eye 420, the second extension 492 abuts the first extension 474. In this manner, the first shackle eye 414 and the second shackle eye 420, through the first extension 474 and the second extension 492, are configured to cooperatively close the winch line 434 from exiting the pulley block 400 when the pulley block 400 is in the closed position. The distal end 444 of the first side plate 410 and the distal end 450 of the second side plate 412 respectively support the first shackle eye 414, including the first extension 474, and the second shackle eye 420, including the second extension 492, away from the groove 464 in the pulley 404 with sufficient clearance for accommodating the winch line 434 around the outer perimeter of the pulley 404 between the pulley 404, the first extension 474, and the second extension 492.

The second eyelet 432 is defined entirely in the second shackle eye 420 with a discorectangle shape characterized as a slot with an elongated middle section 494 and proximal ends 500 extended through the second shackle eye 420. The middle section 494 and both ends 500 of the second eyelet have rounded edges that form arcuate entries with the second shackle eye 420, the arcuate entries having a smooth finish.

Figure 8:
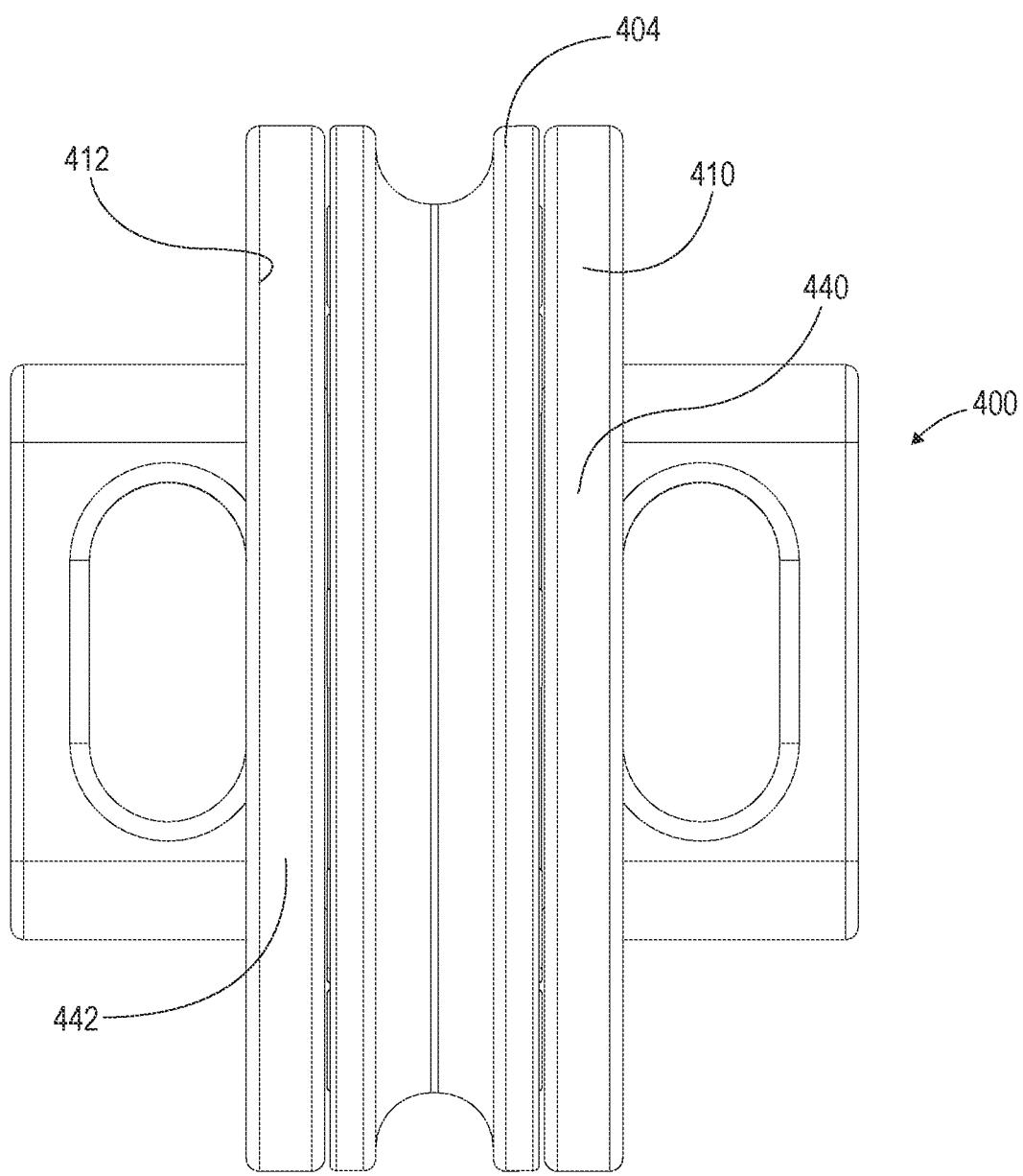
FIG. 8 is a bottom view of the pulley block of FIG. 4.

FIG. 8 depicts a bottom view of the pulley block 400. As shown in FIG. 8, the pulley 404 is interposed between and separates the proximal end 440 of the first side plate 410 and the proximal end 442 of the second side plate 412 in the longitudinal direction of the axle 402 with sufficient clearance so as to accommodate the winch line 434.

Figure 9:
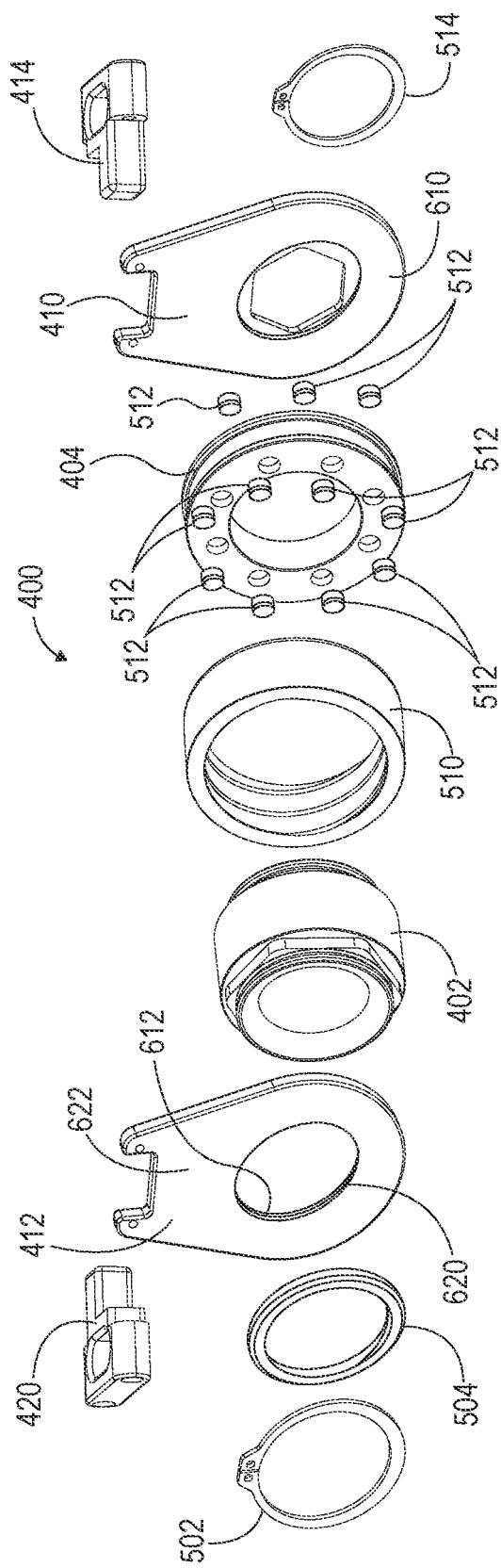
FIG. 9 is an exploded perspective view of the pulley block of FIG. 4.
Figure 10:
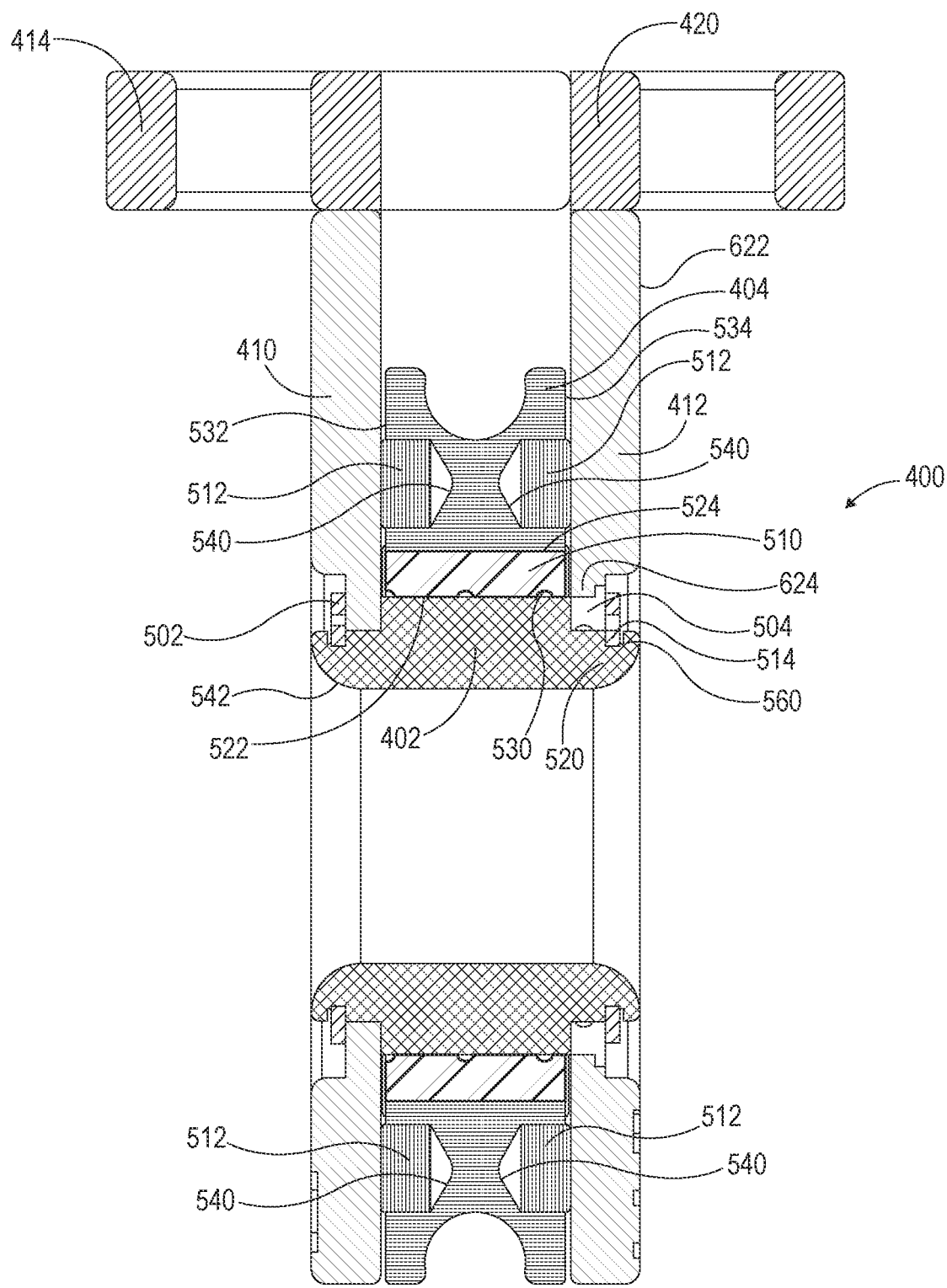
FIG. 10 is a cross-sectional side view of the pulley block of FIG. 4.

FIG. 9 depicts an exploded perspective view of the pulley block 400 and FIG. 10 depicts a cross-sectional side view of the pulley block 400 in an assembled condition. As shown in FIGS. 9 and 10, the pulley block 400 includes a first retaining ring 502 configured for holding the first side plate 410 in place on the axle 402 with respect to the longitudinal direction of the axle 402, a bushing 504 for the second side plate 412, a bushing 510 for the axle 402, a plurality of pucks 512 for spacing the pulley 404 from the first side plate 410 and the second side plate 412, and a second retaining ring 514 configured for holding the bushing 504 for the second side plate 412 in place on the axle 402 with respect to the longitudinal direction of the axle 402.

With reference to FIG. 10, the bushing 504 for the second side plate 412 is press-fit into the second side plate 412. The bushing 504 for the second side plate 412 is configured to support and retain the second side plate 412 on a back end 520 of the axle 402, while the second retaining ring 514 is configured to retain the bushing 504 for the second side plate 412 on the back end 520 of the axle 402 with the second side plate 412 with respect to the longitudinal direction of the axle 402. In an embodiment, the bushing 504 for the second side plate 412 is formed from brass.

The bushing 510 for the axle 402 is press fit into the pulley 404 and features an inner surface 522 and an outer surface 524 with respect to a radial direction of the bushing 510, where the bushing 510 for the axle 402 is configured to rest on the outer surface 524 in the pulley block 400. The inner surface 522 of the bushing 510 has rifling 530, and in an embodiment not shown, the outer surface 524 of the bushing 510 is also rifled. The rifling 530 on the bushing 510 for the axle 402 is configured to guide sand, grit, dirt, and other particles caught between the bushing 510 and the axle 402 out of the pulley block 400 as the bushing 510 rotates relative to the axle 402.

The pulley 404 includes a front face 532 located closer to the first side plate 410 as compared to the second side plate 412, and the pulley 404 includes a back face 534 located closer to the second side plate 412 as compared to the first side plate 410. A plurality of divots 540 is defined in the front face 532 and the back face 534 of the pulley 404. The plurality of divots 540 on each of the front face 532 and the back face 534 of the pulley 404 are respectively equally spaced around the front face 532 and the back face 534 of the pulley 404.

Each divot 540 in the plurality of divots 540 on the front face 532 of the pulley 404 is respectively configured for receiving a puck 512 from the plurality of pucks 512 and retaining the puck 512 in the pulley 404 against the first side plate 410 such that the puck 512 extends from the front face 532 of the pulley 404 to contact the first side plate 410. Each divot 540 in the plurality of divots 540 of the back face 534 of the pulley 404 is configured for receiving a puck 512 from the plurality of pucks 512 and retaining the puck 512 in the pulley 404 against the second side plate 412 such that the puck 512 extends from the back face 534 of the pulley 404 to contact the second side plate 412. In this manner, the plurality of pucks 512 is inserted in the plurality of divots 540 and configured for spacing the front face 532 of the pulley 404 from the first side plate 410 to prevent the pulley 404 and the first side plate 410 from rotating against or otherwise contacting each other, for spacing the back face 534 of the pulley 404 from the second side plate 412 to prevent the pulley 404 and the second side plate 412 from rotating against or otherwise contacting each other, for removing sand, grit, dirt, and other particles from between the front face 532 of the pulley 404 and the first side plate 410, and for removing sand, grit, dirt, and other particles from between the back face 534 of the pulley and the second side plate 412.

With the axle 402 being received in the proximal end 440 of the first side plate 410 and the proximal end 442 of the second side plate 412, and the pulley 404 being supported on the axle 402, the pulley 404 is located between the proximal end 440 of the first side plate 410 and the proximal end 442 of the second side plate 412 in the longitudinal direction of the axle 402, and the plurality of pucks 512 extend from the pulley 404 to contact the proximal end 440 of the first side plate 410 and the proximal end 442 of the second side plate 412. As such, the plurality of pucks 512 is configured for spacing the proximal end 440 of the first side plate 410 and the proximal end 442 of the second side plate 412 from the pulley 404 a sufficient distance to prevent the first side plate 410 and the second side plate 412 from rotating against or otherwise contacting the pulley 404 at the proximal end 440 of the first side plate 410 and the proximal end 442 of the second side plate 412. In an embodiment, the plurality of pucks 512 are formed from a low-friction polymer such as polyoxymethylene, which is sold under the DELRIN® trademark by DuPont.

Figure 11:
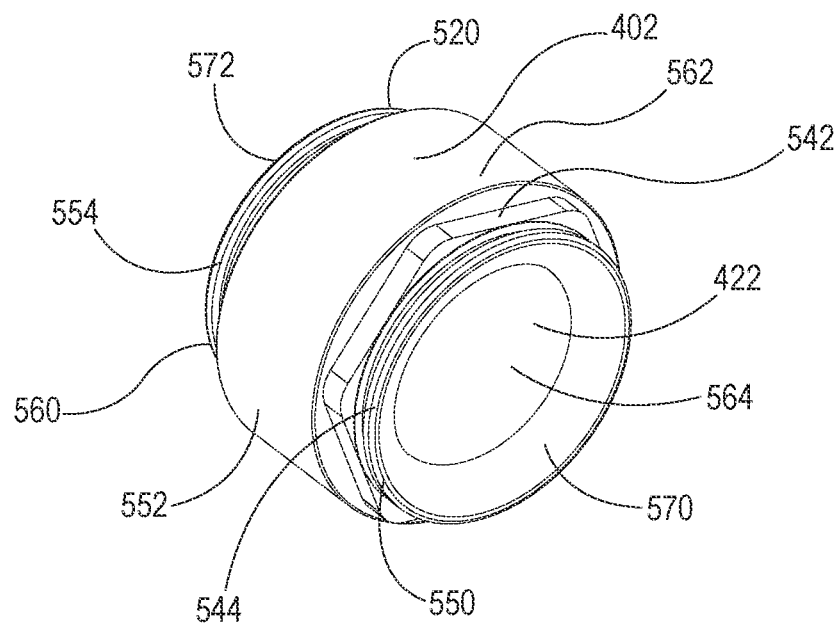
FIG. 11 is a perspective view of an axle from the pulley block of FIG. 4.

FIG. 11 depicts a perspective view of the axle 402, which includes a front end 542 and the back end 520, where, when the axle 402 is assembled in the pulley block 400, the front end 542 of the axle 402 is located closer to the first side plate 410 as compared to the second side plate 412 and the back end 520 of the axle 402 is located closer to the second side plate 412 as compared to the first side plate 410. The front end 542 of the axle 402 is a hex-end, having a hexagonal shape extended in the longitudinal direction of the axle 402. The front end 542 of the axle 402 is cooperatively shaped with the first side plate 410 for being received in the proximal end 440 of the first side plate 410 and fixing the axle 402 with the first side plate 410.

The front end 542 of the axle 402 defines a groove 544 around an outer perimeter thereof, between a flange 550 extended from the front end 542 of the axle 402 and a middle portion 552 of the axle 402 configured for engaging the bushing 510 for the axle 402, with respect to the longitudinal direction of the axle 402. The groove 544 in the front end 542 of the axle 402 is configured for receiving the first retaining ring 502 and holding the first retaining ring 502 between the flange 550 and the middle portion 552 at the front end 542 of the axle 402 along the longitudinal direction of the axle 402.

The back end 520 of the axle 402 has a circular shape extended in the longitudinal direction of the axle 402. The back end 520 of the axle 402 is cooperatively shaped with the second side plate 412 for being received in the proximal end 442 of the second side plate 412 such that the second side plate 412 is retained on the axle 402 in a floating relationship with the axle 402, where the second side plate 412 is capable of rotating around the back end 520 of the axle 402 in a circumferential direction of the axle 402.

The back end 520 of the axle 402 defines a groove 554 around an outer perimeter thereof, between a flange 560 extended from the back end 520 for the axle 402 and the middle portion 552 of the axle 402 along the longitudinal direction of the axle 402. The groove 554 in the back end 520 of the axle 402 is configured for receiving the second retaining ring 514 and holding the second retaining ring 514 between the flange 560 and the middle portion 552 at the back end 520 of the axle 402 along the longitudinal direction of the axle 402.

The middle portion 552 of the axle 402 is interposed between and separates the front end 542 of the axle 402 and the back end 520 of the axle 402 along the longitudinal direction of the axle 402, and is configured for supporting the pulley 404 on the pulley block 400 through the bushing 510 for the axle 402. The axle 402 includes an outer surface 562 with respect to a radial direction of the axle 402, where the outer surface 562 of the axle 402 at the middle portion 552 is extended radially outward, beyond the outer surface 562 at the front end 542 of the axle 402 and the back end 520 of the axle 402. The outer surface 562 of the axle 402 at the middle portion 552 is smooth, and is configured for supporting the bushing 510 for the axle 402 in the pulley block 400.

The central opening 422 of the axle 402 is defined through a center of the axle 402 in the longitudinal direction of the axle 402 such that the axle 402 includes an inner surface 564 with respect to the radial direction of the axle 402, the inner surface 564 extending through the axle 402 in the central opening 422. The inner surface 564 of the central opening 422 forms an arcuate entry 570 for the soft shackle 424 in the central opening 422 at the front end 542 of the axle 402, forms an arcuate entry 572 for the soft shackle 424 in the central opening 422 at the back end 520 of the axle 402, and has a substantially smooth finish so as to accommodate the soft shackle 424 and avoid abrasion therewith in operation of the pulley block 400. The central opening 422 is located concentrically in the axle 402 with respect to the outer surface 562 of the axle 402 such that the middle portion 552 of the axle 402 has a constant thickness in the radial direction of the axle 402 between the outer surface 562 of the axle 402 and the inner surface 564 of the axle 402.

Figure 12:
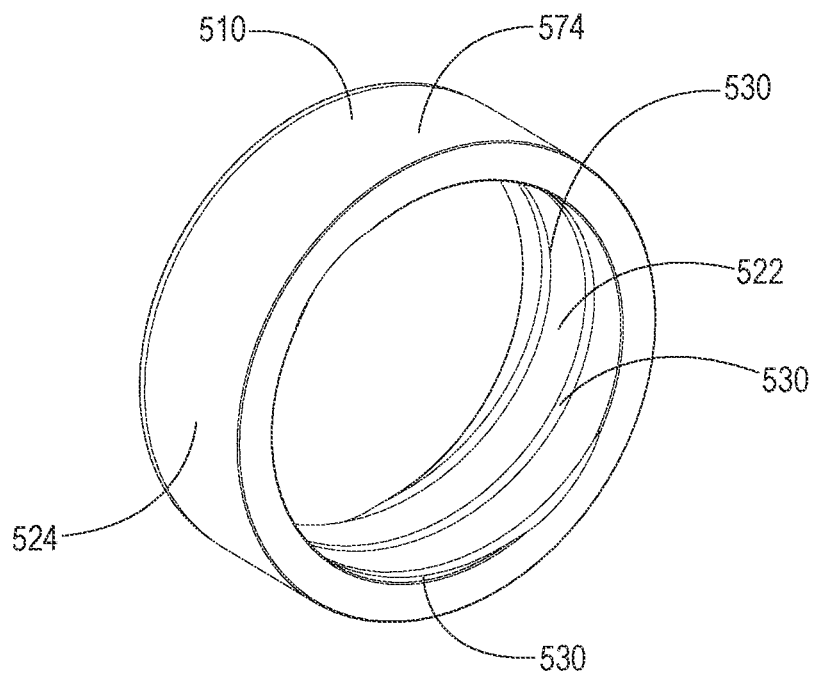
FIG. 12 is a perspective view of a bushing for the axle of FIG. 11.

FIG. 12 depicts a perspective view of the bushing 510 for the axle 402. As shown in FIG. 12, the bushing 510 for the axle 402 includes a body 574 having a circular shape extended in a longitudinal direction of the bushing 510 that is parallel with the longitudinal direction of the axle 402 in the pulley block 400. The body 574 defines the inner surface 522 and the outer surface 524 of the bushing 510 for the axle 402 with respect to the radial direction of the bushing 510, where the inner surface 522 is located concentrically within the outer surface 524 such that the bushing 510 has a constant thickness in a circumferential direction of the bushing 510 between the outer surface 524 of the bushing 510 and the inner surface 522 of the bushing 510.

The rifling 530 on the inner surface 522 of the bushing 510 is formed by at least one groove defined therein. The bushing 510 for the axle 402 is configured for receiving the axle 402 such that the inner surface 522 of the bushing 510 is supported on the outer surface 562 of the axle 402, and in this manner the bushing 510 for the axle 402 is supported on the axle 402 in the pulley block 400. The rifling 530 on the inner surface 522 of the bushing 510 is configured to guide sand, grit, dirt, and other particles out from between the bushing 510 and the axle 402 as the bushing 510 rotates relative to the axle 402. While the depicted embodiment of the pulley block 400 features the rifling 530 on the inner surface 522 of the bushing 510 for the axle 402, the rifling 530 may be alternatively defined in the outer surface 562 of the axle 402 at the middle portion 552 of the axle 402 without departing from the scope of the present disclosure.

Figure 13:
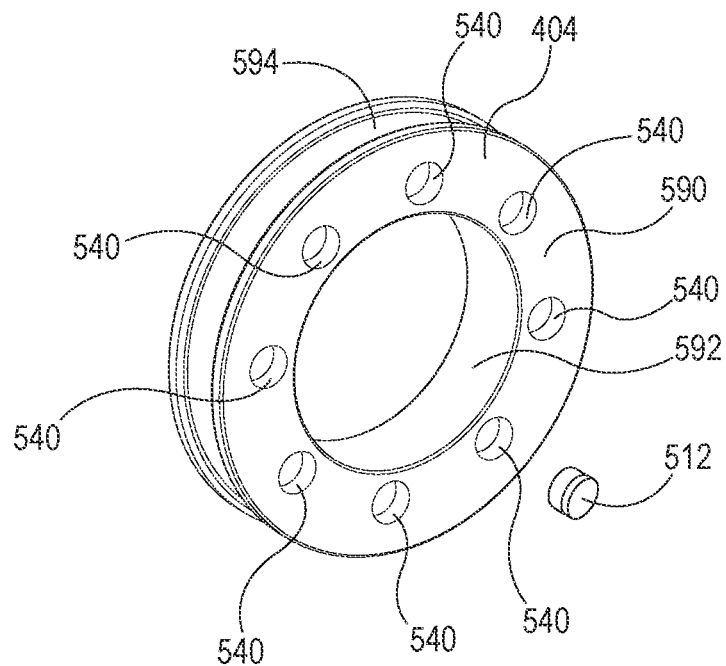
FIG. 13 is an exploded perspective view of a pulley and a puck from the pulley block of FIG. 4.

FIG. 13 depicts an exploded perspective view of the pulley 404 and a puck 512 from the plurality of pucks 512. The pulley 404 is configured for being supported on the bushing 510 for the axle 402, and is configured to rotate around the longitudinal direction of the axle 402, in the circumferential direction of the axle 402, as driven by the winch line 434. As shown in FIG. 13, the pulley 404 includes a body 590 having a circular shape extended in a longitudinal direction of the pulley 404 that is parallel with the longitudinal direction of the axle 402 in the pulley block 400.

The body 590 defines an inner surface 592 and an outer surface 594 of the pulley 404 with respect to the radial direction of the pulley 404, where the inner surface 592 is located concentrically within the outer surface 594 such that the pulley 404 has a constant thickness in a circumferential direction of the pulley 404 between the outer surface 594 of the pulley 404 and the inner surface 592 of the pulley 404. With the inner surface 592 of the pulley 404 supported on the outer surface 524 of the bushing 510 for the axle 402, the pulley 404 is configured to rotate with the soft shackle 424 around the axle 402 via the bushing 510 for the axle 402 such that the winch line 434 does not slide against the pulley 404 and the soft shackle 424 does not slide against the axle 402.

Each divot 540 in the plurality of divots 540 defined in the front face 532 of the pulley 404 and the back face 534 of the pulley 404 respectively correspond with, and are configured for receiving a puck 512 from the plurality of pucks 512. When seated in the plurality of divots 540, the plurality of pucks 512 protrude outward from the front face 532 of the pulley 404 and the back face 534 of the pulley 404 so as to contact the first side plate 410 and the second side plate 412. In this manner, the plurality of pucks 512 is configured to maintain the first side plate 410 and the second side plate 412 in a parallel orientation with the pulley 404, spaced from the pulley 404, and is configured to wipe sand, grit, dirt, and other particles from between the pulley 404, the first side plate 410, and the second side plate 412.

Figure 14:
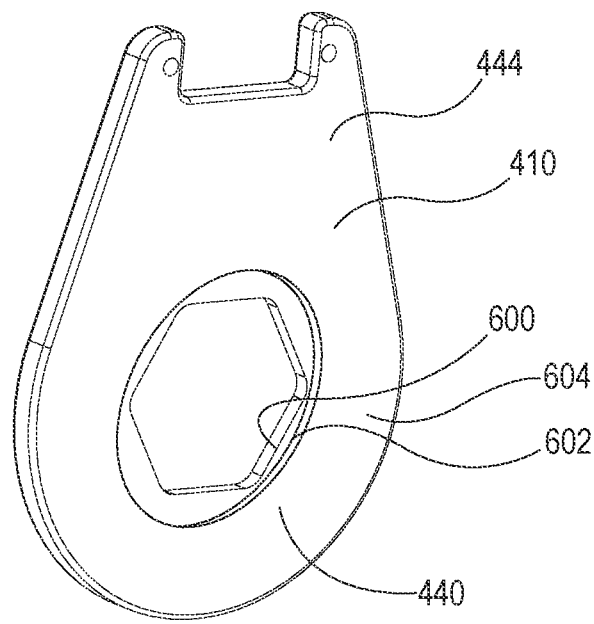
FIG. 14 is a perspective view of a first side plate from the pulley block of FIG. 4.

FIG. 14 depicts a perspective view of the first side plate 410. As shown in FIG. 14, the first side plate 410 defines an opening 600 in the proximal end 440, the opening 600 having a hexagonal shape extended in a longitudinal direction of the first side plate 410 parallel with the longitudinal direction of the axle 402 in the pulley block 400. The opening 600 in the first side plate 410 is configured for receiving the front end 542 of the axle 402 such that the first side plate 410 is fixed in position with the axle 402 in the pulley block 400. While the depicted opening 600 in the first side plate 410 and the front end 542 of the axle 402 have complementary hexagonal shapes, the opening 600 in the first side plate 410 and the front end 542 of the axle 402 can be alternatively formed with functionally similar interlocking locking shapes without departing from the scope of the present disclosure.

The first side plate 410 defines a front recess 602 in a front face 604 of the first side plate 410 around the opening 600 such that the front face 604 of the first side plate 410 extends outward around the front recess 602 in the longitudinal direction of the first side plate 410. With this construction, as shown in FIG. 10, the first retaining ring 502 is disposed in the front recess 602 such that the front face 604 of the first side plate 410 extends outward beyond the first retaining ring 502 in the longitudinal direction of the first side plate 410, and to a longitudinal position shared with the flange 550 at the front end 542 of the axle 402.

As shown in FIG. 9, the first side plate 410 includes a back face 610 having a planar surface that is smooth such that, during use of the pulley block 400, the back face 610 of the first side plate 410 is spaced apart from the front face 532 of the pulley 404 via the plurality of pucks 512 inserted in the plurality of divots 540 defined in the pulley 404. While the depicted pulley block 400 features the plurality of divots 540 defined in the front face 532 of the pulley 404, the plurality of divots 540 may alternatively be defined in the back face 610 of the first side plate 410 with the plurality of pucks 512 inserted therein to contact the front face 532 of the pulley 404 without departing from the scope of the present disclosure.

Figure 15:
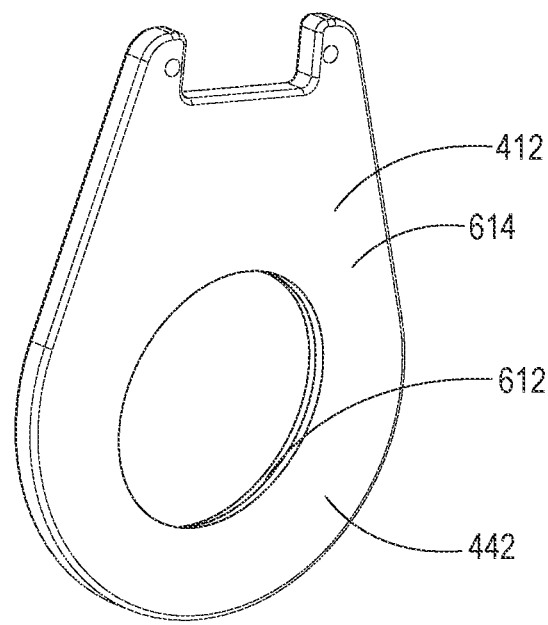
FIG. 15 is a perspective view of a second side plate from the pulley block of FIG. 4.

FIG. 15 depicts a perspective view of the second side plate 412. As shown in FIG. 15, the second side plate 412 defines an opening 612 in the proximal end 442, the opening 612 having a circular shape extended in a longitudinal direction of the second side plate 412 parallel with the longitudinal direction of the axle 402 in the pulley block 400. The opening 612 in the second side plate 412 is configured for receiving the back end 520 of the axle 402 such that the second side plate 412 is in a floating relationship with the axle 402 in the pulley block 400 and capable of rotating around the axle 402 at the back end 520 of the axle 402, in the circumferential direction of the axle 402. While the depicted opening 612 in the second side plate 412 and the back end 520 of the axle 402 have complementary circular shapes, the opening 600 in the first side plate 410 and the front end 542 of the axle 402 can be alternatively formed with functionally similar shapes configured for rotating relative to each other in the pulley block 400 without departing from the scope of the present disclosure.

The second side plate 412 includes a front face 614 having a planar surface that is smooth such that, during use of the pulley block 400, the front face 614 of the second side plate 412 is spaced apart from the back face 534 of the pulley 404 via the plurality of pucks 512 inserted in the plurality of divots 540 defined in the pulley 404. While the depicted pulley block 400 features the plurality of divots 540 defined in the back face 534 of the pulley 404, the plurality of divots 540 may alternatively be defined in the front face 614 of the second side plate 412 with the plurality of pucks 512 inserted therein to contact the back face 534 of the pulley 404 without departing from the scope of the present disclosure.

With reference to FIG. 9, the second side plate 412 defines a back recess 620 in a back face 622 of the second side plate 412 around the opening 612 such that the back face 622 of the second side plate 412 extends outward around the back recess 620 in the longitudinal direction of the second side plate 412. With this construction, as shown in FIG. 10, the second retaining ring 514 is disposed in the back recess 620 such that the back face 622 of the second side plate 412 extends outward beyond the second retaining ring 514 in the longitudinal direction of the second side plate 412, and to a longitudinal position shared with the flange 560 at the back end 520 of the axle 402. A step 624 defined in the opening 612 is configured for receiving and retaining the bushing 504 for the second side plate 412 in the opening 612, where the bushing 504 is inserted into the opening 612 and catches the step 624.

Figure 16:
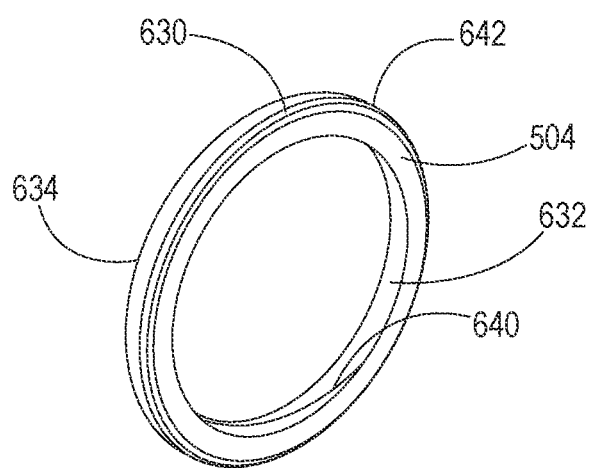
FIG. 16 is a perspective view of a bushing for the second side plate of FIG. 15.

FIG. 16 depicts a perspective view of the bushing 504 for the second side plate 412. As shown in FIG. 16, the bushing 504 for the second side plate 412 includes a body 630 having a circular shape extended in a longitudinal direction of the bushing 504 that is parallel with the longitudinal direction of the axle 402 in the pulley block 400. The body 630 defines an inner surface 632 and an outer surface 634 of the bushing 504 for the second side plate 412 with respect to a radial direction of the bushing 504, where the inner surface 632 is located concentrically within the outer surface 634 such that the bushing 504 has a constant thickness in a circumferential direction of the bushing 504 between the inner surface 632 and the outer surface 634.

The inner surface 632 of the bushing 504 for the second side plate 412 has rifling 640 formed by at least one groove defined therein. The bushing 504 for the second side plate 412 is configured for receiving the axle 402 such that the inner surface 632 of the bushing 504 supports the axle 402 with respect to the second side plate 412, where the bushing 504 supports the axle 402 around the outer surface 562 of the axle 402 at the back end 520 of the axle 402. The rifling 640 on the inner surface 632 of the bushing 504 is configured to guide sand, grit, dirt, and other particles out from between the bushing 504 and back end 520 of the axle 402 as the bushing 504 rotates relative to the axle 402. While the depicted embodiment of the pulley block 400 features the rifling 640 on the inner surface 632 of the bushing 504 for the second side plate 412, the rifling 640 may be alternatively defined in the outer surface 562 of the axle 402 at the back end 520 of the axle 402, and additional rifling may be located on the outer surface 634 of the bushing 504 between the bushing 504 and the second side plate 412 without departing from the scope of the present disclosure.

The bushing 504 for the second side plate 412 includes a flange 642 extended from the outer surface 634 in the radial direction of the bushing 504. The flange 642 on the outer surface 634 of the bushing 504 is configured to catch the step 624 in the opening 612 of the second side plate 412 when the bushing 504 is inserted in the opening 612. In this manner, as shown in FIG. 10, the bushing 504 for the second side plate 412 is configured for retaining the second side plate 412 against the plurality of pucks 512 inserted in the back face 534 of the pulley 404 with support from the second retaining ring 514, and the second side plate 412 is configured to obstruct the bushing 504 at the flange 642 from traveling inward with respect to the axle 402 in the longitudinal direction of the axle 402 beyond the step 624 in the opening 612 of the second side plate 412.

Figure 17:
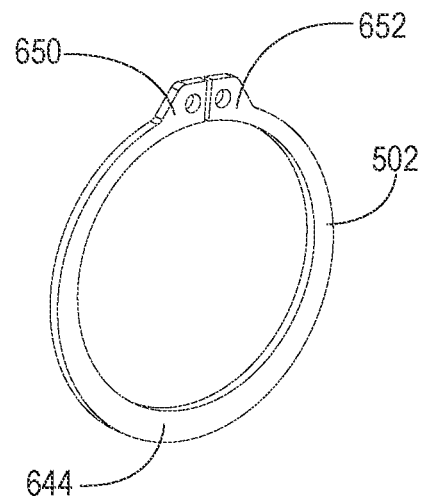
FIG. 17 is a perspective view of a first retaining ring from the pulley block of FIG. 4.

FIG. 17 depicts a perspective view of the first retaining ring 502. As shown in FIG. 17, the first retaining ring 502 includes a body 644 having a first end 650 and a second end 652, where the body 644 is formed with a circular arc shape locating the first end 650 and the second end 652 at a same side of the body 644 with respect to the axle 402 when the first retaining ring 502 is assembled on the axle 402. Regarding installing the first retaining ring 502 on the axle 402, the body 644 of the first retaining ring 502 is configured for being bent between the first end 650 and the second end 652 such that the first end 650 and the second end 652 are further away from each other as compared to when the body 644 is not bent, so as to open the first retaining ring 502 around the front end 542 of the axle 402. In this manner, the first retaining ring 502 is bent around the axle 402 and positioned in the groove 544 behind the flange 550, in the front end 542 of the axle 402. As shown in FIG. 10, with the first retaining ring 502 positioned on the front end 542 of the axle 402 in the pulley block 400, the first retaining ring 502 is configured to retain the first side plate 410 against the plurality of pucks 512 inserted in the front face 532 of the pulley 404.

Figure 18:
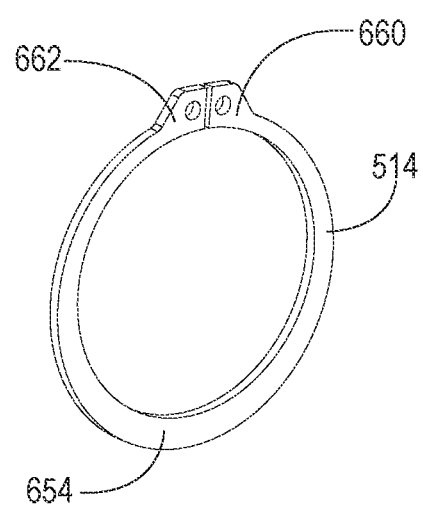
FIG. 18 is a perspective view of a second retaining ring from the pulley block of FIG. 4.

FIG. 18 depicts a perspective view of the second retaining ring 514. The second retaining ring 514 includes similar features, and functions in a similar manner as the first retaining ring 502. As shown in FIG. 18, the second retaining ring 514 includes a body 654 having a first end 660 and a second end 662, where the body 654 is formed with a circular arc shape locating the first end 660 and the second end 662 at a same side of the body 654 with respect to the axle 402 when the second retaining ring 514 is assembled on the axle 402. Regarding installing the second retaining ring 514 on the axle 402, the body 654 of the second retaining ring 514 is configured for being bent between the first end 660 and the second end 662 such that the first end 660 and the second end 662 are further away from each other as compared to when the body 654 is not bent, so as to open the second retaining ring 514 around the back end 520 of the axle 402. In this manner, the second retaining ring 514 is bent around the axle 402 and positioned in the groove 554 behind the flange 560 in the back end 520 of the axle 402. As shown in FIG. 10, with the second retaining ring 514 positioned on the back end 520 of the axle 402 in the pulley block 400, the second retaining ring 514 is configured to retain the bushing 510 for the second side plate 412 on the pulley block 400, and thereby retain the second side plate 412 against the plurality of pucks 512 inserted in the back face 534 of the pulley 404 through the bushing 510.

Figure 19:
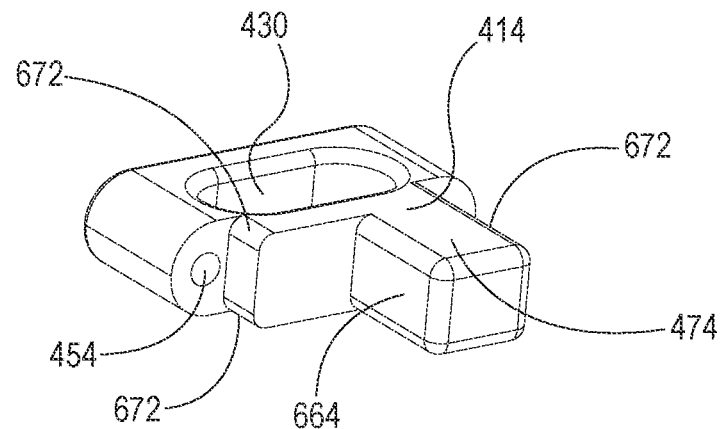
FIG. 19 is a perspective view of a first shackle eye from the pulley block of FIG. 4.
Figure 20:
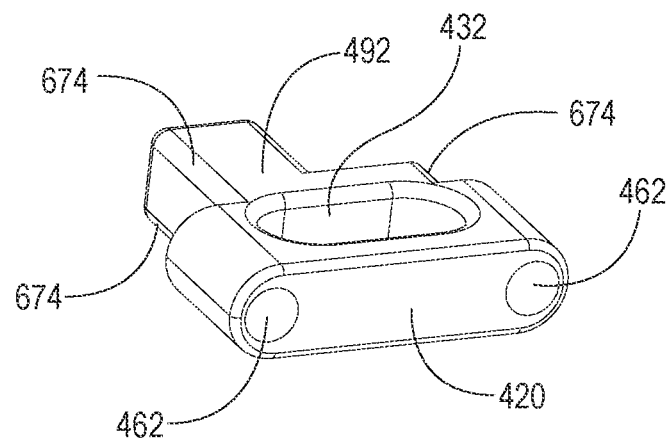
FIG. 20 is a perspective view of a second shackle eye from the pulley block of FIG. 4.

FIG. 19 depicts a perspective view of the first shackle eye 414, and FIG. 20 depicts a perspective view of the second shackle eye 420. The second shackle eye 420 includes similar features, and functions in a similar manner as the first shackle eye 414. As shown in FIG. 19, the first shackle eye 414 defines a step 664 in the first extension 474, and as shown in FIG. 20, the second shackle eye 420 defines a step 670 in the second extension 492. The step 664 in the first extension 474 is configured for contacting the step 670 in the second extension 492 such that the first side plate 410 and the second side plate 412 are configured for engaging each other through the first extension 474 and the second extension 492. With this construction, the second side plate 412 is restricted from rotating around the axle 402 beyond where the second side plate 412 engages the first side plate 410 through contact between the first extension 474 and the second extension 492, preventing over rotation of the second side plate 412 relative to the axle 402 and the first side plate 410.

As shown in the top view depicted in FIG. 7, the first extension 474 and the second extension 492 are configured to contact each other between the step 664 in the first extension 474 and the step 670 in the second extension 492, where the first extension 474 and the second extension 492 pass over the pulley 404 in the longitudinal direction of the axle 402, collectively retaining the winch line on the pulley 404 and supporting the first side plate 410 and the second side plate 412 in a parallel orientation with each other, in the closed position of the pulley block 400. When the second side plate 412 is rotated relative to the axle 402 so as to disengage the step 664 in the first extension 474 and the step 670 in the second extension 492, the step 664 in the first extension 474 and the step 670 in the second extension 492 become spaced from each other, forming a gap between the first extension 474 and the second extension 492 through which the winch line 434 can be inserted in or removed from the pulley block 400.

With reference to FIG. 19, the apertures 454 in the first shackle eye 414 are located on either side of the first eyelet 430 along the first shackle eye 414, such that fasteners (not shown) fix the first shackle eye 414 with the first side plate 410 at either side of the first eyelet 430 in the pulley block 400. The first extension 474 includes rounded edges 672 around an outer perimeter of the first extension 474 where the first extension 474 is inserted into the first side plate 410, and in this manner the first shackle eye 414 is configured for being received in and removed from the first side plate 410.

With reference to FIG. 20, the apertures 462 in the second shackle eye 420 are located on either side of the second eyelet 432 along the second shackle eye 420, such that fasteners (not shown) fix the second shackle eye 420 with the second side plate 412 at either side of the second eyelet 432 in the pulley block 400. The second extension 492 includes rounded edges 674 around an outer perimeter of the second extension 492 where the second extension 492 is inserted into the second side plate 412, and in this manner the second shackle eye 420 is configured for being received in and removed from the second side plate 412.

Figure 21:
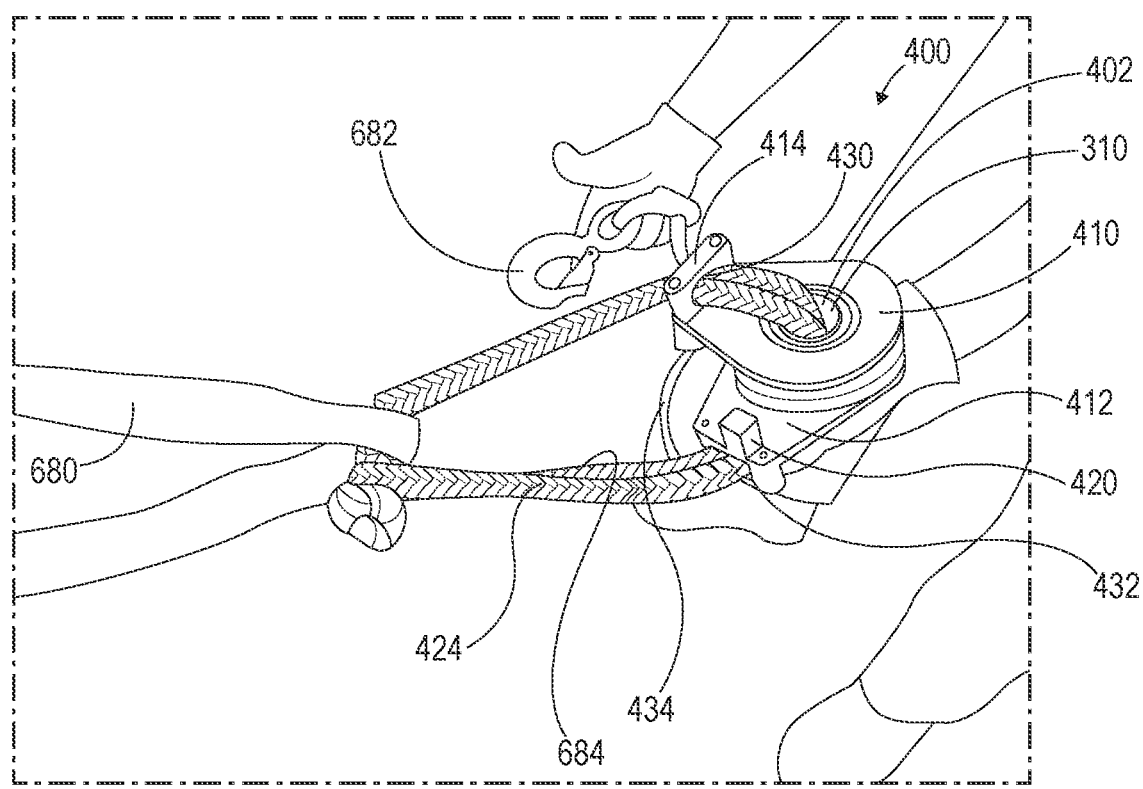
FIG. 21 is a perspective view of the pulley block from FIG. 4 in a method of assembly.

FIGS. 21-25 depict a method of installing the winch line 434 on the pulley block 400 and operating the pulley block 400. As shown in FIG. 21, the pulley block 400 is fully assembled and anchored using the soft shackle 424. The soft shackle 424 passes through the first eyelet 430 of the first shackle eye 414, the central opening 310 of the axle 402, and the second eyelet 432 of the second shackle eye 420 in that order, securing the pulley block 400 to an anchor (not shown) through a webbing 680.

Figure 22:
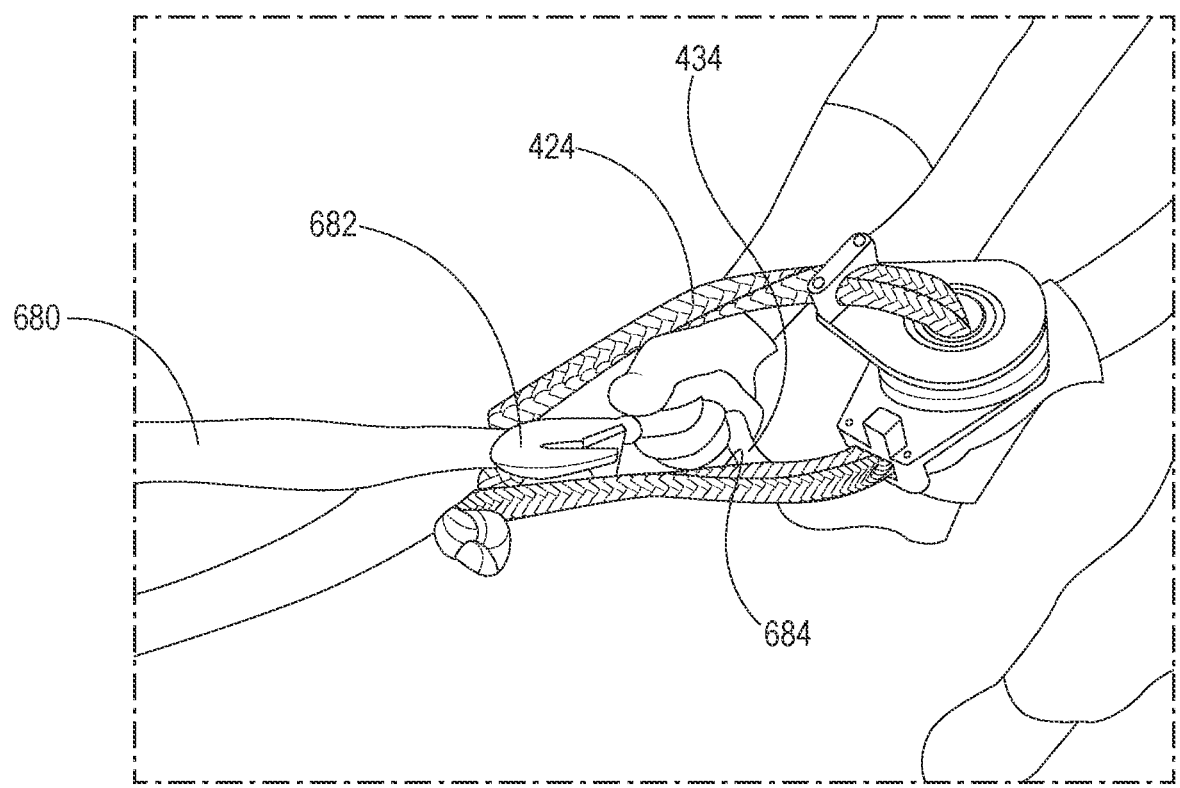
FIG. 22 is another perspective view of the pulley block from FIG. 4 in a method of assembly.
Figure 23:
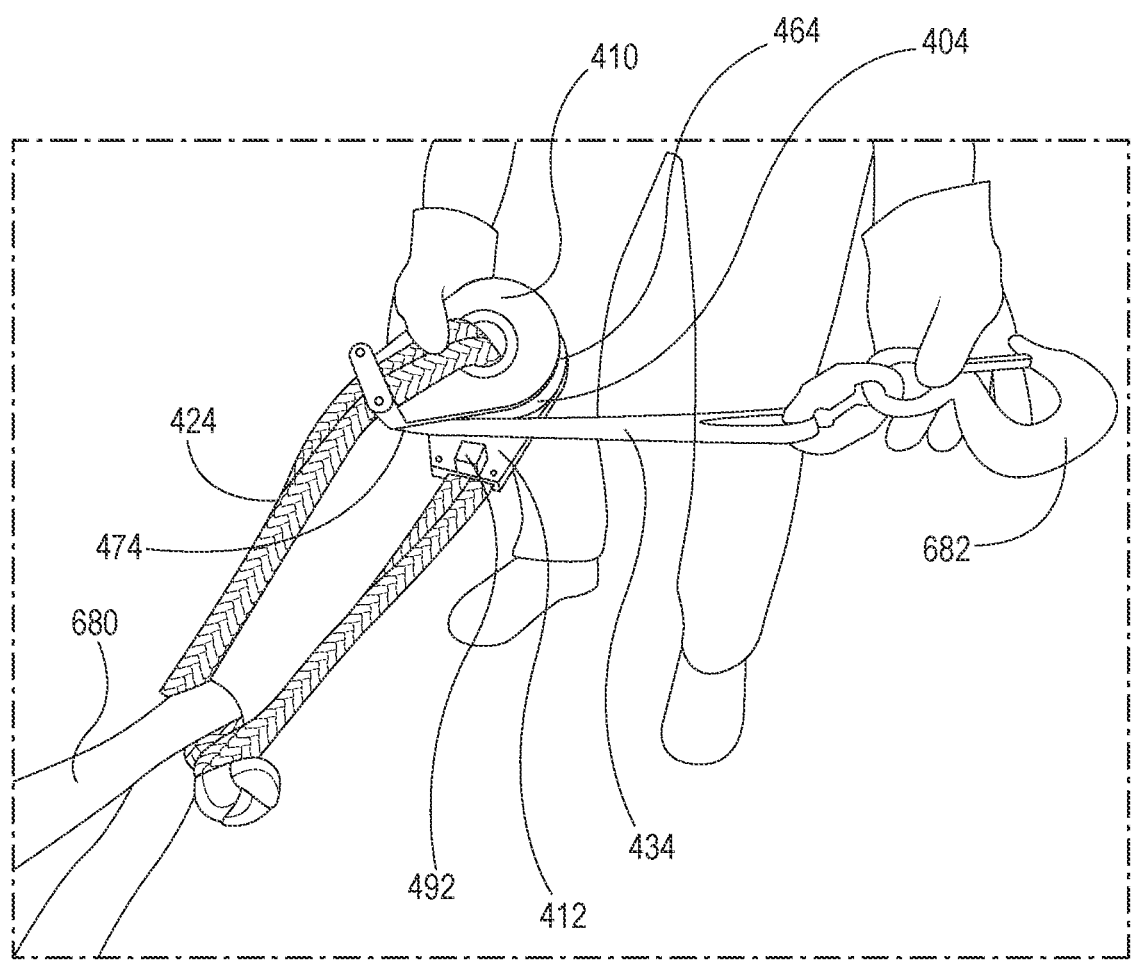
FIG. 23 is another perspective view of the pulley block from FIG. 4 in a method of assembly.

The pulley block is in an open position where the second shackle eye 420 on the second side plate 412 is rotated away from the first shackle eye 414 on the first side plate 410 such that the winch line 434 is capable of passing between the first extension 474 and the second extension 492 in the radial direction of the pulley 404. With the pulley block 400 in the open position, the first shackle eye 414 is spaced further from the second shackle eye 420 as compared to when the pulley block 400 is in the closed position such that the soft shackle 424 forms an opening 684 in the soft shackle 424 between the central opening 422 in the axle 402, the first shackle eye 414, and the second shackle eye 420 through which the winch line 434, which terminates to a hook 682, can pass. As shown in FIG. 22, the hook 582 and the winch line 434 are inserted through the opening 684 in the soft shackle 424. Notably, because the pulley block 400 and the soft shackle 424 are configured to open for receiving the winch line 434, the soft shackle 424 does not have to be removed from the pulley block 400 to insert or remove the winch line 434 therefrom. As shown in FIG. 23, the winch line 434 is arranged in the groove 464 of the pulley 404, around an outer perimeter of the pulley 404, between the pulley 404 and the first extension 474 along the first side plate 410, and between the pulley 404 and the second extension 492 along the second side plate 412.

Figure 24:
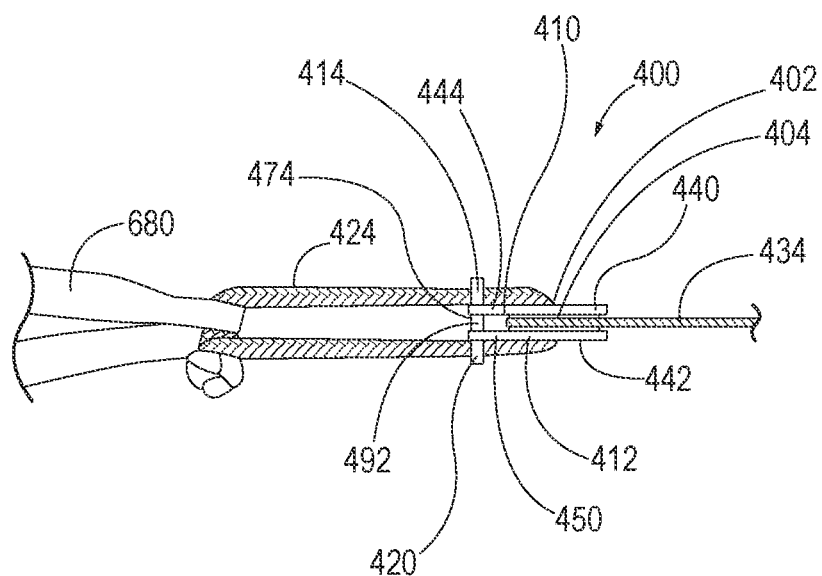
FIG. 24 is a top view of the pulley block from FIG. 4 under load.
Figure 25:
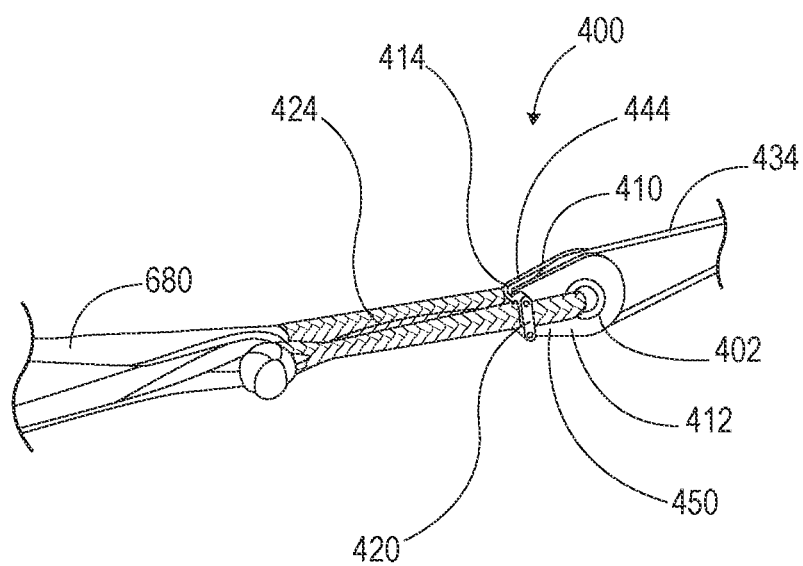
FIG. 25 is a side view of the pulley block from FIG. 4 under load.

FIGS. 24 and 25 depict the pulley block 400 under load between the webbing 680 and the winch line 434. With the pulley block 400 under load, the first shackle eye 414 and the second shackle eye 420 orient lengths of the soft shackle 424 in a direction parallel to the load on the pulley block 400.

FIG. 24 depicts a top view of the pulley block 400 under load. As shown in FIG. 24, the first side plate 410 and the second side plate 412 are engaged with each other through the first shackle eye 414 and the second shackle eye 420 by contact between the first extension 474 and the second extension 492. The distal end 444 of the first side plate 410 and the distal end 450 of the second side plate 412 are retained in a parallel orientation with each other across the pulley 404 in the longitudinal direction of the axle 402 between the soft shackle 424 pressing inward on the first side plate 410 and the second side plate 412, and the first shackle eye 414 and the second shackle eye 420 supporting the first side plate 410 and the second side plate 412 outward against the soft shackle 424. The proximal end 440 of the first side plate 410 and the proximal end 442 of the second side plate 412 are retained in a parallel orientation with each other and the pulley 404 in the longitudinal direction of the axle 402 between the soft shackle 424 pressing inward on the first side plate 410 and the second side plate 412, and the pulley 404 supporting the first side plate 410 and the second side plate 412 outward against the soft shackle 424 through the plurality of pucks 512 (FIG. 10). In this manner, the pulley block 400 retains the first side plate 410 and the second side plate 412 in parallel with each other and the pulley 404 when the pulley block 400 is under load, and prevents the first side plate 410 and the second side plate 412 from pressing the pulley 404 inward in the longitudinal direction of the axle 402.

FIG. 25 depicts a side view of the pulley block 400 under load. As shown in FIG. 25, the first side plate 410 and the second side plate 412 are oriented relative to each other in the closed position of the pulley block 400 such that the distal end 444 of the first side plate 410 and the distal end 450 of the second side plate 412 are located on a same side of the axle 402 and directed in parallel with each other, with respect to the direction of the load along the soft shackle 424 and the winch line 434. In this configuration, the first side plate 410 is engaged with the second side plate 412 through the first shackle eye 414 and the second shackle eye 420 so as to restrict the second side plate 412 from rotating the distal end 450 of the second side plate 412 beyond the distal end 444 of the first side plate 410. The load through the soft shackle 424 causes the soft shackle 424 to press the second side plate 412 to press the second shackle eye 420 against the first shackle eye 414, maintaining engagement therebetween such that the pulley block 400 remains in the closed position on the winch line 434.

Notably, in the event of a temporary reduction in the load on the pulley block 400, the first side plate 410 and the second side plate 412 are inclined to remain in the closed position of the pulley block 400, and in this manner the pulley block 400 prevents the winch line 434 from "falling" or "jumping" out of the pulley 404 in the event of a temporary reduction in load on the pulley block 400, thereby retaining the winch line 434 on the pulley 404.

Figure 26:
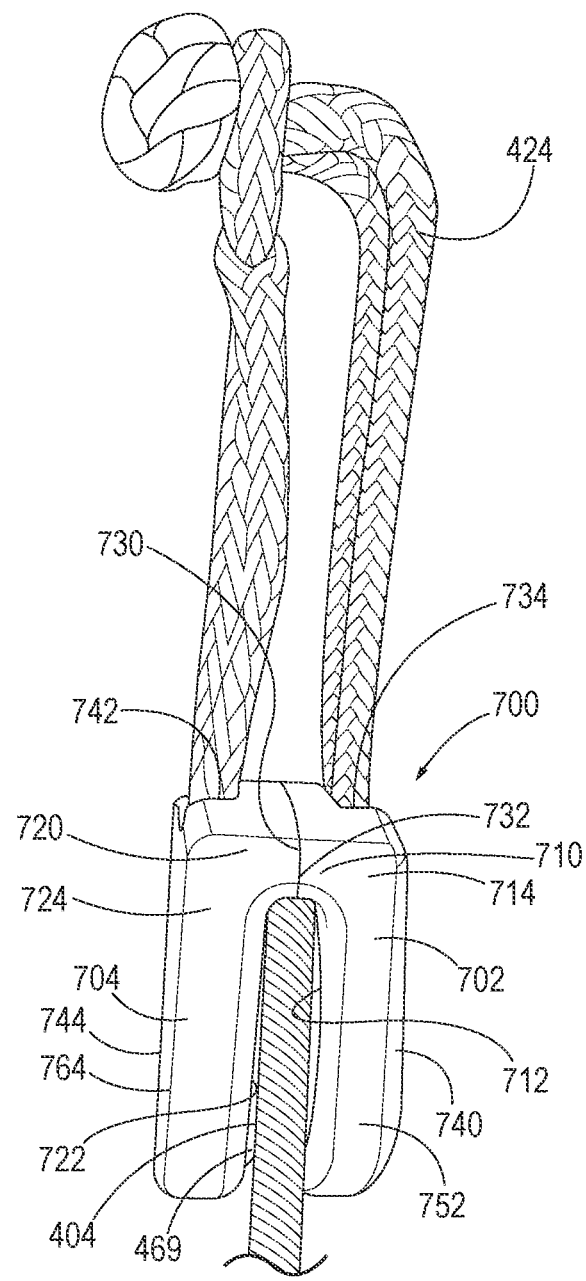
FIG. 26 is a perspective view of a pulley block according to another aspect.

In an alternative embodiment, a pulley block includes a first side plate and a second side plate configured for rotating relative to each other to selectively retain the winch line 434 on the pulley 404 without directly engaging each other. To this end, FIG. 26 depicts a pulley block 700 including a first side plate 702 and a second side plate 704 configured to rotate relative to each other in the circumferential direction of the pulley 404. A first extension 710 supported on the first side plate 702 extends from a back face 712 of the first side plate 702 at a distal end 714 of the first side plate 702, over the pulley 404 with respect to a radial direction of the pulley 404, toward the second side plate 704 with respect to the longitudinal direction of the pulley 404, and is integrally formed from the first side plate 702. A second extension 720 supported on the second side plate 704 extends from a front face 722 of the second side plate 704 at a distal end 724 of the second side plate 704, over the pulley 404 with respect to the radial direction of the pulley 404, toward the first side plate 702 with respect to the longitudinal direction of the pulley 404, and is integrally formed from the second side plate 704.

When the first side plate 702 and the second side plate 704 are positioned such that the first extension 710 and the second extension 720 overlap in the longitudinal direction of the pulley 404, the pulley block 700 is in a closed position where the first extension 710 and the second extension 720 respectively extend toward each other from the first side plate 702 and the second side plate 704 in the longitudinal direction of the pulley 404, over the groove 464 of the pulley 404 in the radial direction of the pulley 404. When the pulley block 700 is in the closed position, the first extension 710 and the second extension 720 contact each other to cooperatively close the winch line 434 from exiting the pulley block 700, and to support the first side plate 702 and the second side plate 704 in a parallel orientation with each other at the distal end 714 of the first side plate 702 and the distal end 724 of the second side plate 704.

When the pulley block 700 is in the closed position, the first extension 710 and the second extension 720 respectively contact each other through a first extended face 730 and a second extended face 732 which are flat and complimentary with each other for maintaining a sliding contact between the first extension 710 and the second extension 720 when the first extension 710 overlaps the second extension 720 in the longitudinal direction of the pulley 404, and in this manner the first side plate 702 and the second side plate 704 are configured for rotating relative to each other in the circumferential direction of the pulley 404 to and beyond the closed position of the pulley block 700. Notably, where the first extension 710 and the second extension 720 are in sliding contact with each other, the first extension 710 and the second extension 720 cooperatively prevent sand, grit, dirt, and other particles from entering the pulley block 700 between the first side plate 702 and the second side plate 704 in the radial direction of the pulley 404, thereby preventing such particles from damaging the winch line 434, increasing friction between the pulley 404 and the axle 402, and increasing friction between the pulley 404, the first side plate 702, and the second side plate 704. Also, the first side plate 702 and the second side plate 704 each include an outer perimeter which extends beyond the pulley 404 and a length of the winch line 434 wrapped around the pulley 404 in the radial direction of the pulley 404, and in this manner the first side plate 702 and the second side plate 704 are configured for preventing sand, grit, dirt, and other particles from entering the pulley block 700 between the first side plate 702 and the second side plate 704, protecting the winch line 434 from environmental conditions, such as when the pulley block 700 is dragged on the outer perimeter of the first side plate 702 and the outer perimeter of the second side plate 704 along ground.

While the depicted embodiment of the first extension 710 and the second extension 720 causes the first extension 710 and the second extension 720 to contact each other when the pulley block 700 is in the closed position, the first extension 710 and the second extension 720 may alternatively form a gap having a clearance smaller than a diameter of the winch line 434 to cooperatively close the winch line 434 from exiting the pulley block 700 without departing from the scope of the present disclosure.

With continued reference to FIG. 26, a first recess 734 defined in a front face 740 of the first side plate 702 through the distal end 714 of the first side plate 702 is configured to accommodate the soft shackle 424 in the first side plate 702, and a second recess 742 defined in a back face 744 of the second side plate 704 through the distal end 724 of the second side plate 704 is configured to accommodate the soft shackle 424 in the second side plate 704. With the first side plate 702 and the second side plate 704 being configured to rotate relative to each other in the circumferential direction of the pulley 404, and with the soft shackle 424 arranged through the first recess 734 in the first side plate 702, the pulley 404, and the second recess 742 in the second side plate 704, the soft shackle 424 bears against the front face 740 of the first side plate 702 and the back face 744 of the second side plate 704 such that the pulley block 700 is driven into the closed position when the soft shackle 424 is under a load directed away from the pulley block 700. To this end, the load on the soft shackle 424 orients a length of the soft shackle 424 accommodated in the first recess 734 in parallel with a length of the soft shackle 424 accommodated in the second recess 742, driving the first recess 734 and the second recess 742 toward a parallel configuration with each other where the distal end 714 of the first side plate 702 and the distal end 724 of the second side plate 704 are located at a same side of the pulley 404 in the radial direction of the pulley 404, placing the pulley block 700 into the closed position. In this manner, the pulley block 700 is configured for being driven to the closed position by a load on the soft shackle 424.

Figure 27:
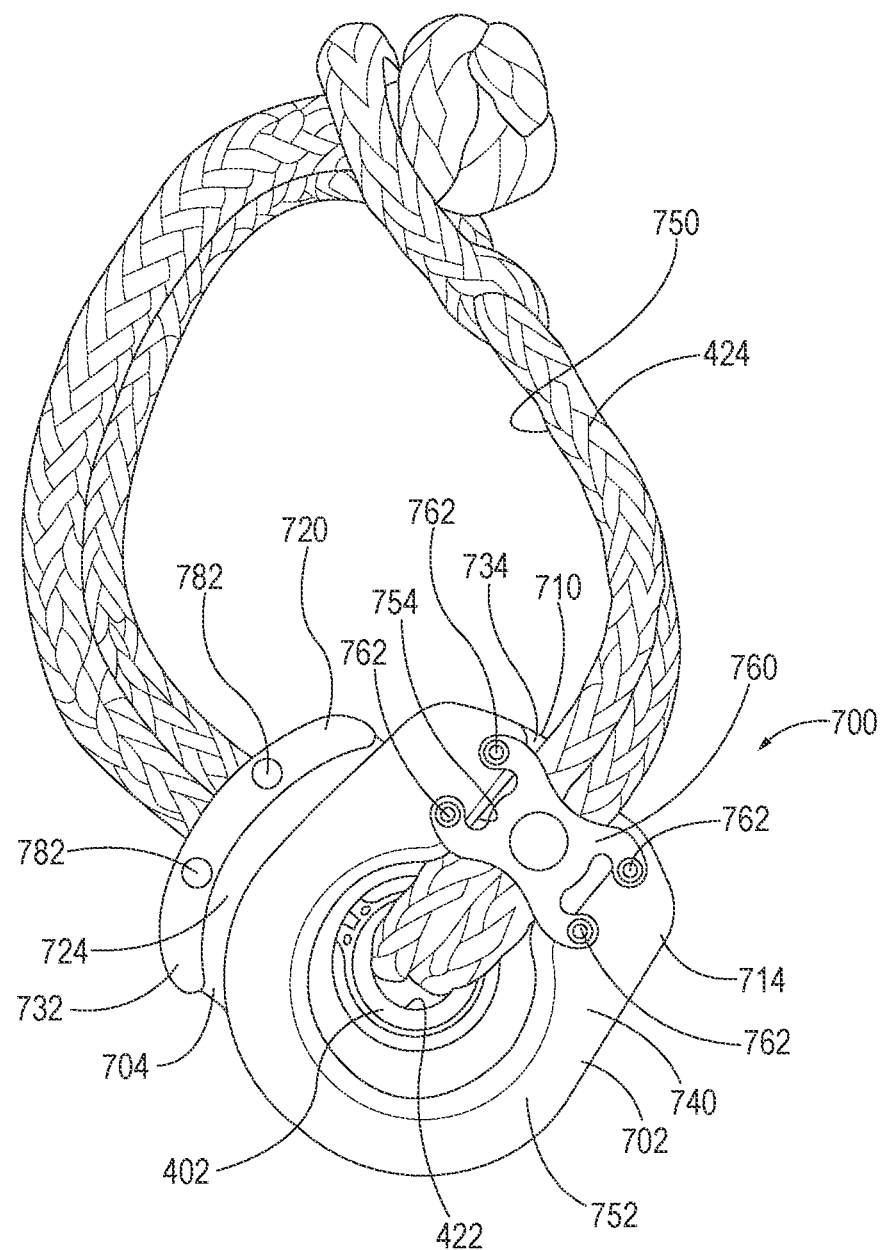
FIG. 27 is a side view of the pulley block of FIG. 26.

FIG. 27 depicts a side view of the pulley block 700 in an open position where the distal end 714 of the first side plate 702 is rotated away from the distal end 724 of the second side plate 704 such that the first extension 710 is spaced from the second extension 720, forming a gap between the first extension and the second extension through which the winch line 434 can be inserted in or removed from the pulley block 700. Notably, the first side plate 702 and the second side plate 704 are each supported on the axle 402 such that the first side plate 702 and the second side plate 704 are retained in a floating relationship with the axle 402 where the first side plate 702 is configured to rotate in the circumferential direction of the axle 402 relative to the second side plate 704, and the second side plate 704 is configured to rotate relative to the first side plate 702 in the circumferential direction of the axle 402. In this manner, when the pulley block 700 is in the open position, the winch line 434 is capable of passing between the first extension 710 and the second extension 720 in the radial direction of the pulley 404. With the pulley block 700 in the open position, the first recess 734 at the distal end 714 of the first side plate 702 is spaced further from the second recess 742 at the distal end 724 of the second side plate 704 as compared to when the pulley block 700 is in the closed position such that the soft shackle 424 forms an opening 750 in the soft shackle 424 between the central opening 422 in the axle 402, the first recess 734, and the second recess 742 through which the winch line (FIG. 26) can pass.

The first recess 734 is defined in the front face 740 of the first side plate 702 from the central opening 422 at a proximal end 752 of the first side plate 702 to the distal end 714 of the first side plate 702, and through the distal end 714 of the first side plate 702. The first recess 734 includes walls 754 configured to abut the soft shackle 424 and maintain alignment between the first side plate 702 and the length of the soft shackle 424 extending through the first recess 734 from the central opening 422 to the distal end 714 of the first side plate 702.

A first bracket 760 is mounted on the front face 740 of the first side plate 702 over the first recess 734 in the axial direction of the pulley 404 for retaining the soft shackle 424 in the first recess 734. The first bracket 760 is removably mounted to the first side plate 702 with a first set of fasteners 762, and in this manner the first bracket 760 is configured to selectively retain the soft shackle 424 in the first recess 734. Notably, with the soft shackle 424 disposed in the first recess 734 against the walls 754 thereof, and covered at the first recess 734 by the first bracket 760, the first side plate 702 and the first bracket 760 are configured for protecting the soft shackle 424 in the first side plate 702 from environmental conditions, such as when the pulley block 700 is dragged on the front face 740 of the first side plate 702 along ground.

Figure 28:
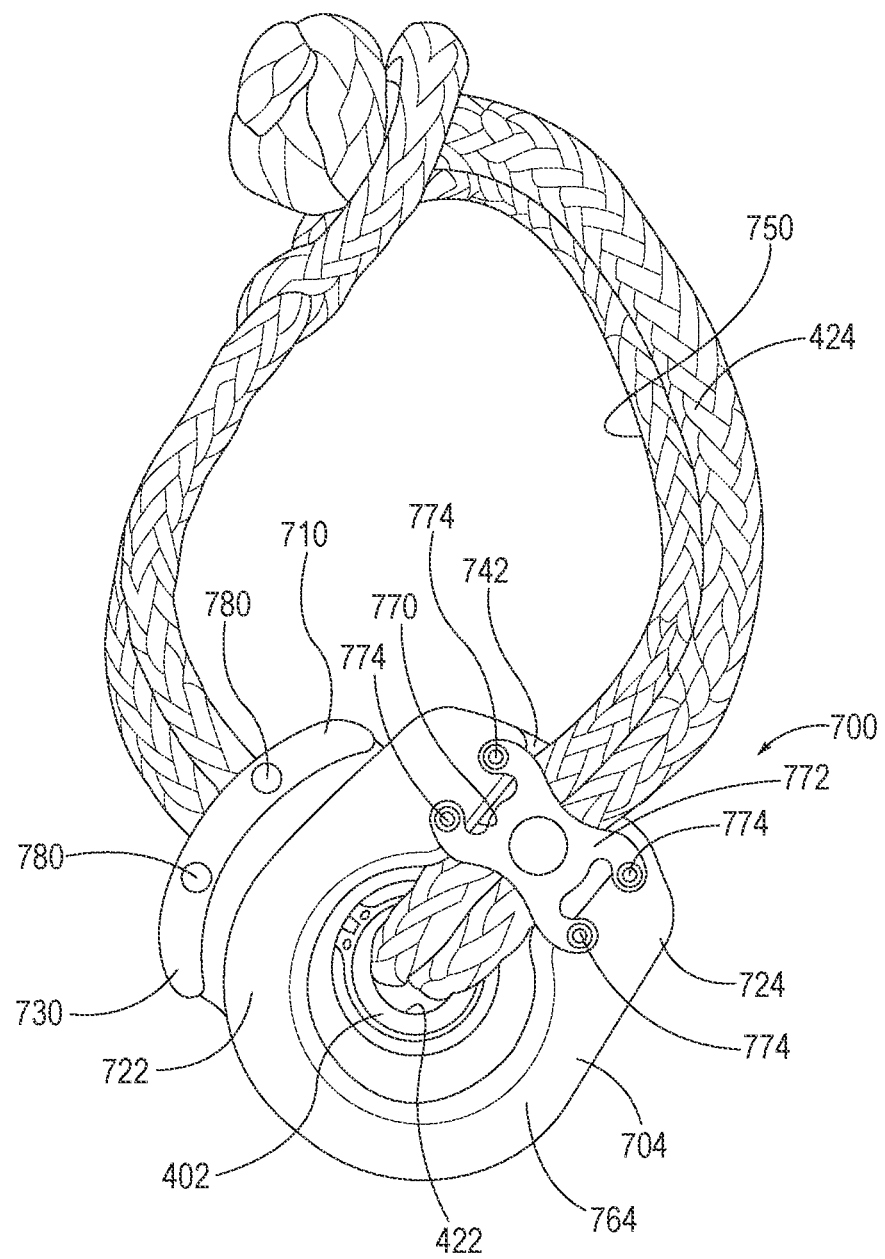
FIG. 28 is a side view of the pulley block of FIG. 26.

Unless otherwise disclosed, the first side plate 702 and the second side plate 704 include similar features and function in a similar manner. To this end, with reference to FIG. 28, the second recess 742 is defined in the back face 744 of the second side plate 704 from the central opening 422 at a proximal end 764 of the second side plate 704 to the distal end 724 of the second side plate 704, and through the distal end 724 of the second side plate 704. The second recess 742 includes walls 770 configured to abut the soft shackle 424 and maintain alignment between the second side plate 704 and the length of the soft shackle 424 extending through the second recess 742 from the central opening 422 to the distal end 724 of the second side plate 704.

A second bracket 772 is mounted on the front face 722 of the second side plate 704 over the second recess 742 in the longitudinal direction of the pulley 404 for retaining the soft shackle 424 in the second recess 742. The second bracket 772 is removably mounted to the second side plate 704 with a second set of fasteners 774, and in this manner the second bracket 772 is configured to selectively retain the soft shackle 424 in the second recess 742. Notably, with the soft shackle 424 disposed in the second recess 742 against the walls 770 thereof, and covered at the second recess 742 by the second bracket 772, the second side plate 704 and the second bracket 772 are configured for protecting the soft shackle 424 in the second side plate 704 from environmental conditions, such as when the pulley block 700 is dragged on the back face 744 of the second side plate 704 along ground.

In an embodiment, the first set of fasteners 762 and the second set of fasteners 774 are threaded screws respectively configured for engaging the first side plate 702 and the second side plate 704, however the first set of fasteners 762 and the second set of fasteners 774 may additionally or alternatively include other types of fasteners without departing from the scope of the present disclosure. Also, while the first set of fasteners 762 and the second set of fasteners 774 are respectively depicted as including four fasteners, the first set of fasteners 762 and the second set of fasteners 774 may include more or fewer fasteners without departing from the scope of the present disclosure.

The first extension 710 includes a first set of magnets 782 disposed therein, where the first set of magnets 782 forms a portion of the first extended face 730. As shown in FIG. 27, the second extension 720 includes a second set of magnets 782 disposed therein, where the second set of magnets 782 forms a portion of the second extended face 732. The first set of magnets 782 and the second set of magnets 782 are configured to attract each other from the first extension 710 and the second extension 720 so as to drive the first extension 710 and the second extension 720 toward each other. In this manner, the first set of magnets 782 and the second set of magnets 782 are configured to cooperatively drive the pulley block 700 to the closed position and maintain the pulley block 700 in the closed position. While the first set of magnets 782 and the second set of magnets 782 are each depicted to include two magnets, the first set of magnets 782 and the second set of magnets 782 may respectively include more or fewer magnets without departing from the scope of the present disclosure.

Figure 29:
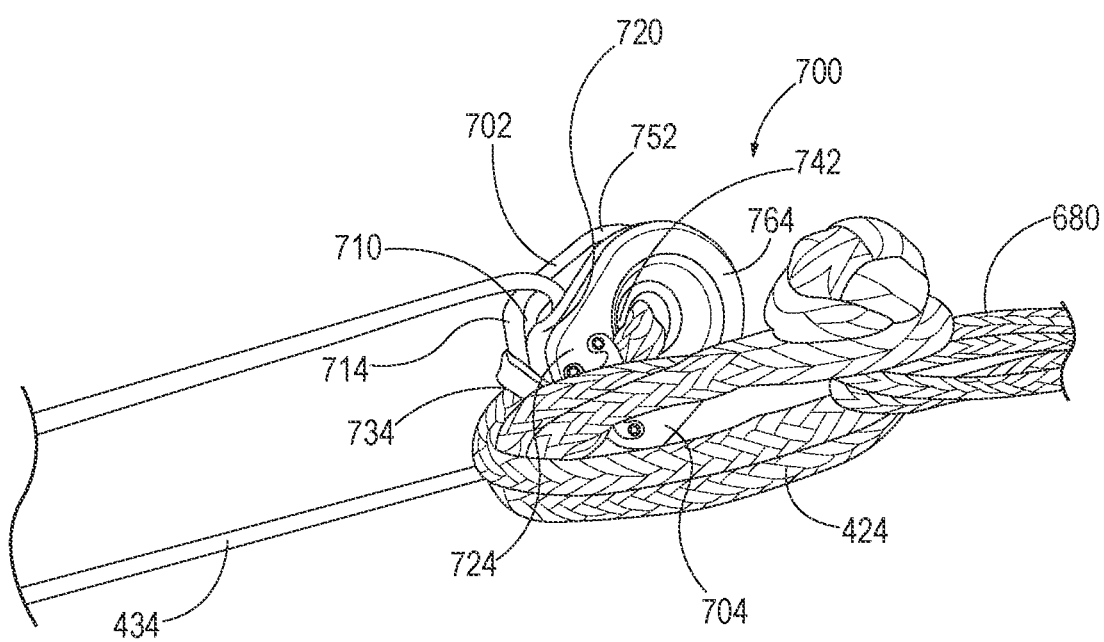
FIG. 29 is a perspective view of the pulley block of FIG. 26.

FIG. 29 depicts the pulley block 700 anchored through the webbing 680 via the soft shackle 424 and under load from the winch line 434, where the soft shackle 424 is slack because the pulley block 700 incurred an abrupt loss in tension between the winch line 434 and the webbing 680, or was otherwise redirected such that the winch line 434 is no longer engaged with the pulley 404, and the soft shackle 424 is not driving the pulley block 700 toward the closed position or maintaining the pulley block 700 in the closed position. Notably, the first set of magnets 782 and the second set of magnets 782 retain the pulley block 700 in the closed position, where the first extension 710 and the second extension 720 prevent the winch line 434 from exiting the pulley block 700. Also, the first recess 734 and the second recess 742 respectively direct the soft shackle 424 through the distal end 714 of the first side plate 702 and the distal end 724 of the second side plate 704, away from the proximal end 752 of the first side plate 702 and the proximal end 764 of the second side plate 704 such that the soft shackle 424 does not become trapped or tangled with any portion of the pulley block 700. Under circumstances where the abrupt loss of tension in the webbing 680 is temporary or where the load directed through the winch line 434 and the webbing 680 is otherwise intermittent, such as when the load is a pulling force generated by a vehicle that loses and regains traction for generating the pulling force, the pulley block 700 is configured to orient itself from the configuration shown in FIG. 29 to align the winch line 434 and the webbing 680 and guide the winch line 434 into the groove 314 of the pulley 404, as shown in FIG. 26. Unless otherwise disclosed, the pulley block 700 includes similar features and functions in a similar manner as the pulley block 400.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed is:

1. A pulley block, comprising:
   a first side plate;
   a second side plate;
   an axle received in the first side plate and the second side plate, the axle being fixed with the first side plate and in a floating relationship with the second side plate such that the second side plate is retained on the axle and capable of rotating around the axle, wherein the axle defines a central opening configured for receiving a soft shackle;
   a bushing for the axle; and
   a pulley supported on the axle between the first side plate and the second side plate in a longitudinal direction of the axle, the pulley being configured for receiving a winch line around an outer perimeter thereof;
   wherein the bushing for the axle is configured to support the pulley on the axle between the first side plate and the second side plate in the longitudinal direction of the axle, and
   wherein an inner surface of the bushing for the axle defines rifling configured to guide sand, grit, dirt, and other particles caught between the bushing and the axle out of the pulley block as the bushing rotates relative to the axle.

2. The pulley block of claim 1, further comprising:
   a first shackle eye supported on the first side plate, the first shackle eye being configured for receiving the soft shackle; and
   a second shackle eye supported on the second side plate, the second shackle eye being configured for receiving the soft shackle.

3. The pulley block of claim 2, wherein the second side plate is configured to rotate relative to the first side plate such that the first shackle eye is engaged with the second shackle eye so as to close the winch line from exiting the pulley block.

4. The pulley block of claim 2, further comprising:
   a first extension that is integrally formed from the first shackle eye and extends from the first side plate, over the pulley in the longitudinal direction of the axle; and
   a second extension that is integrally formed from the second shackle eye and extends from the second side plate, over the pulley in the longitudinal direction of the axle,
   wherein the second side plate is configured to rotate around the axle relative to the first side plate such that the second extension abuts the first extension and the second side plate is restricted from rotating around the axle beyond where the second side plate engages the first side plate through contact between the first extension and the second extension.

5. The pulley block of claim 1, further comprising:
   a first extension that extends from the first side plate, over the pulley in the longitudinal direction of the axle; and
   a second extension that extends from the second side plate, over the pulley in the longitudinal direction of the axle,
   wherein the second side plate is configured to rotate around the axle relative to the first side plate such that the second extension abuts the first extension and the second side plate is restricted from rotating around the axle beyond where the second side plate engages the first side plate through contact between the first extension and the second extension.

6. The pulley block of claim 1, wherein the axle includes a back end received in the second side plate, the back end of the axle having a circular shape extended in the longitudinal direction of the axle, and
   wherein the second side plate defines an opening having a circular shape extended in the longitudinal direction of the axle, the opening in the second side plate being configured for receiving the back end of the axle such that the second side plate is retained on the axle in the floating relationship with the axle.

7. The pulley block of claim 1, wherein the axle includes a front end received in the first side plate, a back end received in the second side plate, and an inner surface with respect to a radial direction of the axle, the inner surface extending through the axle in the central opening, and wherein the inner surface of the axle forms an arcuate entry for the soft shackle in the central opening at the front end of the axle, and the inner surface of the axle forms an arcuate entry for the soft shackle at the back end of the axle.

8. The pulley block of claim 1, further comprising a bushing for the second side plate configured to support the second side plate on the axle.

9. The pulley block of claim 1, wherein:

the first side plate includes a proximal end and a distal end, the axle is received in the proximal end of the first side plate, the distal end of the first side plate extends from the proximal end of the first side plate in a radial direction of the pulley, the second side plate includes a proximal end and a distal end, the axle is received in the proximal end of the second side plate, and the distal end of the second side plate extends from the proximal end of the second side plate in the radial direction of the pulley.

10. The pulley block of claim 9, further comprising:

a first shackle eye supported on the distal end of the first side plate, the first shackle eye being configured for receiving the soft shackle; and a second shackle eye supported on the distal end of the second side plate, the second shackle eye being configured for receiving the soft shackle.

11. The pulley block of claim 9, further comprising:

a first extension that extends from the distal end of the first side plate, over the pulley in the longitudinal direction of the axle, wherein the distal end of the of the first side plate supports the first extension away from the pulley with sufficient clearance for accommodating the winch line between the pulley and the first extension in the radial direction of the pulley; and a second extension that extends from the distal end of the second side plate, over the pulley in the longitudinal direction of the axle, wherein the distal end of the second side plate supports the second extension away from the pulley with sufficient clearance for accommodating the winch line between the pulley and the second extension in the radial direction of the pulley;

wherein the second side plate is configured to rotate around the axle relative to the first side plate such that the second extension abuts the first extension and the second side plate is restricted from rotating around the axle beyond where the second side plate engages the first side plate through contact between the first extension and the second extension.

12. The pulley block according to claim 1, wherein the axle includes a front end received in the first side plate, the front end of the axle being a hex-end having a hexagonal shape extended in the longitudinal direction of the axle, and wherein the first side plate defines an opening having a hexagonal shape extended in a longitudinal direction of the first side plate, the opening in the first side plate being configured for receiving the front end of the axle such that the first side plate is fixed in position with the axle in the pulley block.

13. A pulley block, comprising:

a first side plate;

a second side plate;

an axle received in the first side plate and the second side plate, the axle being fixed with the first side plate and in a floating relationship with the second side plate such that the second side plate is retained on the axle and capable of rotating around the axle, wherein the axle defines a central opening configured for receiving a soft shackle; and a pulley supported on the axle between the first side plate and the second side plate in a longitudinal direction of the axle, the pulley being configured for receiving a winch line around an outer perimeter thereof;

wherein the pulley defines a plurality of divots in a front face of the pulley and a back face of the pulley, and the pulley block further comprises a plurality of pucks, wherein the plurality of pucks is inserted in the plurality of divots at the front face of the pulley and the back face of the pulley such that the plurality of pucks extend from the front face of the pulley toward the first side plate, and extend from the back face of the pulley toward the first side plate.

14. The pulley block of claim 13, wherein the plurality of pucks extending from the front face of the pulley contact the first side plate and the plurality of pucks extending from the back face of the pulley contact the second side plate.

15. The pulley block of claim 13, wherein the plurality of pucks is configured for spacing the pulley from the first side plate to prevent the pulley and the first side plate from contacting each other, and the plurality of pucks is configured for spacing the pulley from the second side plate to prevent the pulley and the second side plate from contacting each other.

16. The pulley block of claim 13, wherein the plurality of pucks is configured for removing sand, grit, dirt, and other particles from between the front face of the pulley and the first side plate, and the plurality of pucks is configured for removing sand, grit, dirt, and other particles from between the back face of the pulley and the second side plate.

17. A pulley block, comprising:

a first side plate;

a second side plate;

an axle received in the first side plate and the second side plate, the axle being fixed with the first side plate and in a floating relationship with the second side plate such that the second side plate is retained on the axle and capable of rotating around the axle, wherein the axle defines a central opening configured for receiving a soft shackle; and a pulley supported on the axle between the first side plate and the second side plate in a longitudinal direction of the axle, the pulley being configured for receiving a winch line around an outer perimeter thereof;

wherein the axle includes a front end received in the first side plate, the front end of the axle defines a groove around an outer perimeter thereof, and the pulley block further comprises a first retaining ring positioned in the groove at the front end of the axle, the first retaining ring being configured for holding the first side plate in place on the axle with respect to the longitudinal direction of the axle, wherein the first side plate has a front face with a front recess defined in the front face, and wherein the first retaining ring is disposed in the front recess such that the front face of the first side plate extends outward beyond the first retaining ring in the longitudinal direction of the axle, wherein the first side plate and the second side plate are rotatable relative to each other on the axle between a closed position and an open position, wherein, in the closed position, a first extension extending from the first side plate over a portion of the pulley toward the second side plate aligns with a second extension extending from the second side plate over a portion of the pulley toward the first side plate, wherein, in the closed position, the first extension and the second extension prevent a winch line received around the outer perimeter of the pulley from exiting the pulley block, wherein, in the closed position, no part of the first extension contacts any part of the second extension, wherein, in the open position, the first extension and the second extension are rotated away from each other sufficient to allow insertion of or removal of a winch line around the outer perimeter of the pulley, wherein a first shackle eye that defines a first eyelet for a soft shackle is supported on the first side plate, wherein a second shackle eye that defines a second eyelet for the soft shackle is supported on the second side plate, and wherein magnets in the first extension extending from the first side plate and in the second extension extending from the second side plate are configured to attract each other and thereby urge the first side plate and the second side plate to be in the closed position.

18. The pulley block of claim 17, wherein the axle includes:
a back end received in the second side plate;
a middle portion that is interposed between and separates the front end of the axle and the back end of the axle, along the longitudinal direction of the axle, and is configured for supporting the pulley; and
a flange extended from the front end of the axle;
wherein the groove defined in the front end of the axle is located between the flange at the front end of the axle and the middle portion of the axle.

19. The pulley block of claim 17, wherein the first retaining ring includes a body configured for being bent around the axle and positioned in the groove at the front end of the axle.

* * * * *